US 011743970B2

United States Patent
Wang et al.

(10) Patent No.: US 11,743,970 B2
(45) Date of Patent: Aug. 29, 2023

(54) SESSION ESTABLISHMENT METHOD AND APPARATUS, AND PACKET SENDING METHOD AND APPARATUS

(71) Applicant: Huawei Technologies Co., Ltd., Shenzhen (CN)

(72) Inventors: Yuan Wang, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/225,527

(22) Filed: Apr. 8, 2021

(65) Prior Publication Data

US 2021/0227625 A1    Jul. 22, 2021

Related U.S. Application Data

(63) Continuation of application No. PCT/CN2019/109179, filed on Sep. 29, 2019.

(30) Foreign Application Priority Data

Oct. 8, 2018 (CN) .......................... 201811169314.9

(51) Int. Cl.
H04W 76/12 (2018.01)
H04W 8/18 (2009.01)
(Continued)

(52) U.S. Cl.
CPC ............ H04W 76/40 (2018.02); H04W 76/11 (2018.02)

(58) Field of Classification Search
CPC ....... H04W 76/40; H04W 76/11; H04W 8/20; H04W 76/12; H04W 8/186; H04B 3/544; H04B 7/18558
See application file for complete search history.

(56) References Cited

U.S. PATENT DOCUMENTS 9,105,009 B2 *  8/2015  MacLeod ............... G06Q 10/10
2008/0311926 A1  12/2008  Fischer et al.
(Continued)

FOREIGN PATENT DOCUMENTS

CN   101296504 A   10/2008
CN   101404630 A   4/2009
(Continued)

OTHER PUBLICATIONS

Huawei et al "Solution for KI#4 and KI#5: Basic architecture forsupporting dynamic 5G LAN-type service and 5GLAN communication," 3GPP Draft; S2-189054, Aug. 31, 2018, XP051537782, 3 pages.

(Continued)

Primary Examiner — Andrew Wendell
(74) Attorney, Agent, or Firm — Conley Rose, P.C.

(57) ABSTRACT

A session establishment method includes receiving, by a control device, first request information, where the first request information is used to indicate that a first terminal device requests to access a group communication service, determining a first terminal device group to which the first terminal device belongs, determining a target forwarding device that serves the first terminal device group, where the target forwarding device is a forwarding device capable of supporting a group communication service, and controlling the first terminal device to establish a session with the target forwarding device, to enable terminal devices in a same group to establish sessions with a same forwarding device such that group service access between the terminal devices in the group can be completed by using the same forwarding device.

20 Claims, 5 Drawing Sheets

(51) Int. Cl.
*H04W 76/40* (2018.01)
*H04W 76/11* (2018.01)

(56) References Cited

U.S. PATENT DOCUMENTS

| | | | |
|---|---|---|---|
| 2015/0229677 A1 | 8/2015 | Gu et al. | |
| 2016/0277191 A1* | 9/2016 | Lee | H04W 12/069 |
| 2016/0373183 A1* | 12/2016 | Yi | H04W 4/80 |
| 2018/0124848 A1* | 5/2018 | Fukuta | H04W 28/18 |
| 2019/0230726 A1 | 7/2019 | Jin et al. | |
| 2019/0386894 A1 | 12/2019 | Hu et al. | |
| 2020/0178136 A1* | 6/2020 | Xu | H04W 48/16 |
| 2020/0205122 A1* | 6/2020 | Liu | H04W 68/005 |
| 2020/0221540 A1* | 7/2020 | Sun | H04W 68/005 |

FOREIGN PATENT DOCUMENTS

| | | |
|---|---|---|
| CN | 107566096 A | 1/2018 |
| CN | 108307530 A | 7/2018 |
| CN | 108512878 A | 9/2018 |
| EP | 3836577 A1 | 6/2021 |
| WO | 2018175974 A1 | 9/2018 |

OTHER PUBLICATIONS

Interdigital Inc "Solution for 5GLAN Group Communication," 3GPP Draft; S2-189053, E-Mail REV1 S2-188499, Aug. 31, 2018, XP051537781, 4 pages.

Vivo "Solution for how to support 5G LAN group communication," 3GPP Draft; S2-187937, Aug. 14, 2018, XP051536893, 6 pages.

3GPP TS 23.501 V15.3.0 "3rd Generation Partnership Project; Technical Specification Group Services and System Aspects; System Architecture for the 5G System; Stage 2 (Release 15)," Sep. 2018, 226 pages.

3GPP TS 23.502 V15.3.0, "3rd Generation Partnership Project; Technical Specification Group Services and System Aspects; Procedures for the 5G System; Stage 2 (Release 15)," Sep. 2018, 329 pages.

3GPP TS 29.244 V15.3.0, "3rd Generation Partnership Project; Technical Specification Group Core Network and Terminals; Interface between the Control Plane and the User Plane Nodes; Stage 3 (Release 15)," Sep. 2018, 189 pages.

SA WG2 Meeting #128-bis, S2-188382, "Solution for 5GLAN Group Communication," InterDigital Inc, Aug. 20-24, 2018, Sophia Antipolis, France, 3 pages.

* cited by examiner

SESSION ESTABLISHMENT METHOD AND APPARATUS, AND PACKET SENDING METHOD AND APPARATUS

CROSS-REFERENCE TO RELATED APPLICATIONS

This application is a continuation of International Patent Application No. PCT/CN2019/109179 filed on Sep. 29, 2019, which claims priority to Chinese Patent Application No. 201811169314.9 filed on Oct. 8, 2018, both of which are hereby incorporated by reference in their entireties.

TECHNICAL FIELD

This application relates to the communications field, and more specifically, to a session establishment method and apparatus, and a packet sending method and apparatus.

BACKGROUND

Currently, a conventional service supported by a mobile network uses a server-client mode. In other words, mutual communication between clients is completed through proxy forwarding of a server. For example, for a client #1 and a client #2 on which chat applications are installed, if the client #1 expects to send a message to the client #2 through the mobile network, a data packet (including a message of the chat application) of the client #1 is first sent to a server of the chat application through the mobile network. Then, the server sends the data packet to the client #2 through the mobile network, to complete mutual communication between the client #1 and the client #2.

With development of communications technologies, the foregoing technology cannot meet a low-latency requirement of a user for a communication service.

SUMMARY

This application provides a session establishment method and apparatus, and a packet sending method and apparatus, to meet a low-latency requirement of a user for a communication service.

According to a first aspect, a session establishment method is provided, including receiving, by a control device, first request information, where the first request information is used to indicate that a first terminal device requests to access a group communication service, determining a first terminal device group to which the first terminal device belongs, determining a target forwarding device that serves the first terminal device group, where the target forwarding device is a forwarding device capable of supporting a group communication service, and controlling the first terminal device to establish a session with the target forwarding device.

The first terminal device may subsequently use the session to perform a group communication service with another terminal device in the first terminal device group.

According to a forwarding device selection method provided in this application, terminal devices in a same group can establish sessions with a same forwarding device, so that group service access between the terminal devices in the group can be completed by using the same forwarding device. Because data exchange of a group communication service does not need forwarding by a server, a transmission latency of the service can be reduced, to improve user experience, improve communication efficiency, and meet a low-latency requirement of a user for a communication service.

"A forwarding device capable of supporting a group communication service" may be understood as that the forwarding device can probe a packet, to determine a terminal device to which the packet needs to be sent.

Alternatively, "a forwarding device capable of supporting a group communication service" may be understood as that the forwarding device can determine a forwarding policy based on whether a packet belongs to the group communication service. For example, in a case in which the packet belongs to the group communication service, the forwarding device does not send the packet to a server, but sends the packet to a terminal device.

Optionally, the determining a target forwarding device that serves the first terminal device group includes obtaining mapping relationship information, where the mapping relationship information is used to indicate a forwarding device corresponding to at least one terminal device group, the at least one terminal device group includes the first terminal device group, and the forwarding device can provide a group communication service for the corresponding terminal device group, and determining, based on the mapping relationship information, a forwarding device corresponding to the first terminal device group as the target forwarding device.

That "the mapping relationship information is used to indicate a forwarding device corresponding to at least one terminal device group" may be understood as that the mapping relationship information is used to indicate a forwarding device corresponding to each of the at least one terminal device group. The at least one terminal device group includes the first terminal device group, and each forwarding device can provide a group communication service for a corresponding terminal device group.

Therefore, the control device can easily determine, based on the mapping relationship information, the forwarding device corresponding to each terminal device group, to further ensure that terminal devices in a same terminal device group establish sessions with a same forwarding device.

Optionally, the method further includes sending a query request to a network repository entity, where the query request is used to request the network repository entity to query for a forwarding device capable of supporting a group communication service in a plurality of forwarding devices, and receiving response information sent by the network repository entity, where the response information includes at least one alternative forwarding device capable of supporting a group communication service. The determining a target forwarding device that serves the first terminal device group includes determining the target forwarding device from the at least one alternative forwarding device.

As an example instead of a limitation, the network repository entity may include a network function repository (NFR) entity.

Therefore, a processing load of the control device can be reduced, a performance requirement of the control device can be reduced, and practicability of this application can be improved.

Optionally, the query request includes a group identifier of the first terminal device group, or the query request includes a group communication service identifier.

Therefore, the network repository entity can determine, based on the group identifier or the group communication service identifier, that a forwarding device capable of supporting a group communication service needs to be provided, thereby further improving communication reliability.

Optionally, the method includes recording, in mapping relationship information, a mapping relationship between the first terminal device group and the target forwarding device, where the mapping relationship information is used to indicate a forwarding device corresponding to at least one terminal device group, the at least one terminal device group includes the first terminal device group, and the forwarding device can provide a group communication service for the corresponding terminal device group.

Therefore, when request information of a second terminal device that belongs to a same terminal device group as the first terminal device is received, it can be easily determined, based on the mapping relationship information, that the target forwarding device needs to establish a session with the second terminal device.

Optionally, the control device includes a session management entity.

As an example instead of a limitation, the session management entity may include a session management function (SMF) entity.

Optionally, the receiving, by a control device, first request information includes receiving, by the control device, a first message sent by the first terminal device, where the first message carries the first request information. The first message carries a device identifier of the first terminal device, and the determining a first terminal device group to which the first terminal device belongs includes sending second request information and the device identifier of the first terminal device to a group management entity, where the second request information is used to request the group management entity to determine the terminal device group to which the first terminal device belongs, and determining the first terminal device group based on the group identifier, of the first terminal device group, sent by the group management entity F.

As an example instead of a limitation, the group management entity may include a group management function (GMF) entity.

Optionally, the receiving, by a control device, first request information includes receiving, by the control device, a first message sent by the first terminal device, where the first message carries the first request information. The first message carries the group identifier of the first terminal device group, and the determining a first terminal device group to which the first terminal device belongs includes determining the first terminal device group based on the group identifier of the first terminal device group.

Optionally, the control device includes a group management entity.

Optionally, the receiving, by a control device, first request information includes receiving, by the control device, a second message sent by a session management entity, where the second message carries the first request information. The second message carries a device identifier of the first terminal device, and the determining a first terminal device group to which the first terminal device belongs includes determining the first terminal device group based on the device identifier of the first terminal device.

Optionally, the receiving, by a control device, first request information includes receiving, by the control device, a second message sent by a session management entity, where the second message carries the first request information. The second message carries the group identifier of the first terminal device group, and the determining a first terminal device group to which the first terminal device belongs includes determining the first terminal device group based on the group identifier of the first terminal device group.

Optionally, the forwarding device includes a user plane entity.

As an example instead of a limitation, the user plane entity may include a user plane function (UPF) entity.

According to a second aspect, a packet sending method is provided. The method includes recording, by a forwarding device, mapping relationship information, where the mapping relationship information is used to indicate a session corresponding to at least one device identifier, and the session is a session between a terminal device indicated by the corresponding device identifier and the forwarding device, receiving a first packet sent by a first terminal device by using a first session, and obtaining a second device identifier carried in a destination address field of the first packet, if the second device identifier is recorded in the mapping relationship information, determining, based on the mapping relationship information, a second session corresponding to the second device identifier, and sending, by using the second session, the first packet to a second terminal device indicated by the second device identifier.

That "the mapping relationship information is used to indicate a session corresponding to at least one device identifier" may be understood as that the mapping relationship information is used to indicate a session corresponding to each of the at least one device identifier.

Alternatively, that "the mapping relationship information is used to indicate a session corresponding to at least one device identifier" may be understood as that the mapping relationship information is used to indicate a one-to-one correspondence between a plurality of device identifiers and a plurality of sessions.

According to the packet sending method provided in this application, the forwarding device probes a packet from the first terminal device, to determine the second terminal device to which the packet needs to be sent, and then the packet is sent by using a session between the first terminal device and the second terminal device, to complete group service access between the first terminal device and the second terminal device in the group. Because data exchange of a group communication service does not need forwarding by a server, a transmission latency of the service can be reduced, to improve user experience, improve communication efficiency, and meet a low-latency requirement of a user for a communication service.

Optionally, a session recorded in the mapping relationship information further includes a first identifier, and a first identifier of each session is used to indicate whether the session is used to bear a group communication service, and before the obtaining a second device identifier carried in a destination address field of the first packet, the method further includes determining, based on a first identifier of the first session, that the first session is used to bear a group communication service.

Optionally, a packet received by the forwarding device further includes a second identifier, and a second identifier of each packet is used to indicate whether the packet is used to belong to a group communication service, and before the obtaining a second device identifier carried in a destination address field of the first packet, the method further includes determining, based on a second identifier of the first packet, that the first packet belongs to a group communication service.

Therefore, when determining that the packet belongs to a group communication service, the forwarding device can perform packet probing and forwarding, and when determining that the packet does not belong to a group communication service, the forwarding device can directly send the packet to a server, thereby improving communication efficiency, and further improving practicability and compatibility of this application.

Optionally, the forwarding device includes a user plane entity.

As an example instead of a limitation, the user plane entity may include a UPF entity.

According to a third aspect, a forwarding device selection apparatus is provided, including a receiving unit, configured to receive first request information, where the first request information is used to indicate that a first terminal device requests to access an group communication service, and a processing unit, configured to determine a first terminal device group to which the first terminal device belongs, determine a target forwarding device that serves the first terminal device group, where the target forwarding device is a forwarding device capable of supporting an intra-group communication service, and control the first terminal device to establish a session with the target forwarding device.

Optionally, the processing unit is configured to obtain mapping relationship information, where the mapping relationship information is used to indicate a forwarding device corresponding to at least one terminal device group, the at least one terminal device group includes the first terminal device group, and the forwarding device can provide a group communication service for the corresponding terminal device group, and determine, based on the mapping relationship information, a forwarding device corresponding to the first terminal device group as the target forwarding device.

Optionally, the apparatus further includes a sending unit, configured to send a query request to a network repository entity. The query request is used to request the network repository entity to query for a forwarding device, in a plurality of forwarding devices, capable of supporting a group communication service. The receiving unit is further configured to receive response information sent by the network repository entity. The response information includes at least one alternative forwarding device capable of supporting a group communication service. The processing unit is configured to determine the target forwarding device from the at least one alternative forwarding device.

Optionally, the query request includes a group identifier of the first terminal device group, or the query request includes an intra-group communication service identifier.

Optionally, the processing unit is configured to record, in mapping relationship information, a mapping relationship between the first terminal device group and the target forwarding device. The mapping relationship information is used to indicate a forwarding device corresponding to at least one terminal device group. The at least one terminal device group includes the first terminal device group, and the forwarding device can provide a group communication service for the corresponding terminal device group.

Optionally, the device is disposed on a session management entity or is a session management entity.

Optionally, the receiving unit is configured to receive a first message sent by the first terminal device, and the first message carries the first request information, where the first message carries a device identifier of the first terminal device, the sending unit included in the apparatus is configured to send second request information and the device identifier of the first terminal device to a group management entity, the second request information is used to indicate to request the group management entity to determine the terminal device group to which the first terminal device belongs, and the processing unit is configured to determine the first terminal device group based on the group identifier, of the first terminal device group, sent by the group management entity.

Optionally, the receiving unit is configured to receive a first message sent by the first terminal device, and the first message carries the first request information. The first message carries the group identifier of the first terminal device group. The processing unit is configured to determine the first terminal device group based on the group identifier of the first terminal device group.

Optionally, the control device includes a group management entity.

Optionally, the receiving unit is configured to receive a second message sent by a session management entity, and the second message carries the first request information, where the second message carries a device identifier of the first terminal device, and the processing unit is configured to determine the first terminal device group based on the device identifier of the first terminal device.

Optionally, the receiving unit is configured to receive a second message sent by a session management entity, and the second message carries the first request information, where the second message carries the group identifier of the first terminal device group, and the processing unit is configured to determine the first terminal device group based on the group identifier of the first terminal device group.

Optionally, the forwarding device includes a user plane entity.

The units in the apparatus are respectively configured to perform the steps of the communication method in the first aspect and the implementations of the first aspect.

In a design, the apparatus is a communications chip. The communications chip may include an input circuit or interface configured to send information or data, and an output circuit or interface configured to receive information or data.

In another design, the apparatus is a control device. The control device may include a transmitter configured to send information or data, and a receiver configured to receive information or data.

According to a fourth aspect, a packet sending apparatus is provided, including a processing unit, configured to record mapping relationship information, where the mapping relationship information is used to indicate a session corresponding to at least one device identifier, and the session is a session between a terminal device indicated by the corresponding device identifier and a forwarding device, a receiving unit, configured to receive a first packet sent by a first terminal device by using a first session, and obtain a second device identifier carried in a destination address field of the first packet, where if the second device identifier is recorded in the mapping relationship information, the processing unit is configured to determine, based on the mapping relationship information, a second session corresponding to the second device identifier, and a sending unit, configured to send, by using the second session, the first packet to a second terminal device indicated by the second device identifier.

Optionally, a session recorded in the mapping relationship information further includes a first identifier, and a first identifier of each session is used to indicate whether the session is used to bear an intra-group communication service. The processing unit is configured to determine, based on a first identifier of the first session, that the first session is used to bear an intra-group communication service.

Optionally, a packet received by the forwarding device further includes a second identifier, and a second identifier of each packet is used to indicate whether the packet is used to belong to an intra-group communication service. The processing unit is configured to determine, based on a second identifier of the first packet, that the first packet belongs to an intra-group communication service.

Optionally, the apparatus is disposed on a user plane entity or is a user plane entity.

The units in the apparatus are respectively configured to perform the steps of the communication method in the second aspect and the implementations of the second aspect.

In a design, the communications apparatus is a communications chip. The communications chip may include an input circuit or interface configured to send information or data, and an output circuit or interface configured to receive information or data.

In another design, the communications apparatus is a forwarding device. The forwarding device may include a transmitter configured to send information or data, and a receiver configured to receive information or data.

According to a fifth aspect, a control device is provided, including a processor and a memory. The memory is configured to store a computer program. The processor is configured to invoke the computer program from the memory and run the computer program, to enable the control device to perform the communication method in the first aspect and various implementations of the first aspect.

Optionally, there are one or more processors and one or more memories.

Optionally, the memory may be integrated with the processor, or the memory and the processor are separately disposed.

Optionally, the control device further includes a transmitting machine (transmitter) and a receiving machine (receiver).

According to a sixth aspect, a forwarding device is provided, including a processor and a memory. The memory is configured to store a computer program. The processor is configured to invoke the computer program from the memory and run the computer program, to enable the forwarding device to perform the communication method in the second aspect and various implementations of the second aspect.

Optionally, there are one or more processors and one or more memories.

Optionally, the memory may be integrated with the processor, or the memory and the processor are separately disposed.

Optionally, the forwarding device further includes a transmitter and a receiver.

According to a seventh aspect, a communications system is provided, including the foregoing control device and/or the forwarding device.

In a possible design, the communications system may further include another device interacting with the control device in the solutions provided in the embodiments of this application.

In another possible design, the communications system may further include another device interacting with the forwarding device in the solutions provided in the embodiments of this application.

According to an eighth aspect, a computer program product is provided. The computer program product includes a computer program (which may also be referred to as code or an instruction). When the computer program is run, a computer is enabled to perform the method according to any one of the possible implementations of the first aspect or any one of the possible implementations of the second aspect.

According to a ninth aspect, a computer-readable medium is provided. The computer-readable medium stores a computer program (which may also be referred to as code or an instruction). When the computer program is run on a computer, the computer is enabled to perform the method according to any one of the possible implementations of the first aspect or any one of the possible implementations of the second aspect.

According to a tenth aspect, a chip system is provided. The chip system includes a memory and a processor. The memory is configured to store a computer program. The processor is configured to invoke the computer program from the memory and run the computer program, to enable a communications device on which the chip system is installed to perform the method according to any one of the possible implementations of the first aspect or any one of the possible implementations of the second aspect.

The chip system may include an input circuit or interface configured to send information or data, and an output circuit or interface configured to receive information or data.

According to the solutions provided in this application, terminal devices in a same group can establish sessions with a same forwarding device, so that group service access between the terminal devices in the group can be completed by using the same forwarding device. Because data exchange of a group communication service does not need forwarding by a server, a transmission latency of the service can be reduced, to improve user experience, improve communication efficiency, and meet a low-latency requirement of a user for a communication service.

DESCRIPTION OF EMBODIMENTS

The following describes technical solutions of this application with reference to accompanying drawings.

Terminologies such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on the computing device may be components. One or more components may reside within a process and/or a thread of execution, and the components may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

The technical solutions in the embodiments of this application may be applied to various communications systems, for example, a Global System for Mobile Communications (GSM), a code-division multiple access (CDMA) system, a wideband code-division multiple access (WCDMA) system, a General Packet Radio Service (GPRS) system, a Long-Term Evolution (LTE) system, an LTE frequency-division duplex (FDD) system, an LTE time-division duplex (TDD) system, a Universal Mobile Telecommunications System (UMTS), a Worldwide Interoperability for Microwave Access (WiMAX) communications system, a future 5th generation (5G) system, or a New Radio (NR) system.

Generally, a conventional communications system supports a limited quantity of connections and is easy to implement. However, with development of communications technologies, a mobile communications system not only supports conventional communication, but also supports, for example, device-to-device (D2D) communication, machine to machine (M2M) communication, machine-type communication (MTC), and vehicle-to-everything (V2X) communication, for example, vehicle-to-vehicle (V2V) communication, vehicle-to-infrastructure (V2I) communication, vehicle-to-pedestrian (V2P) communication, and vehicle-to-network (V2N) communication.

Figure 1:
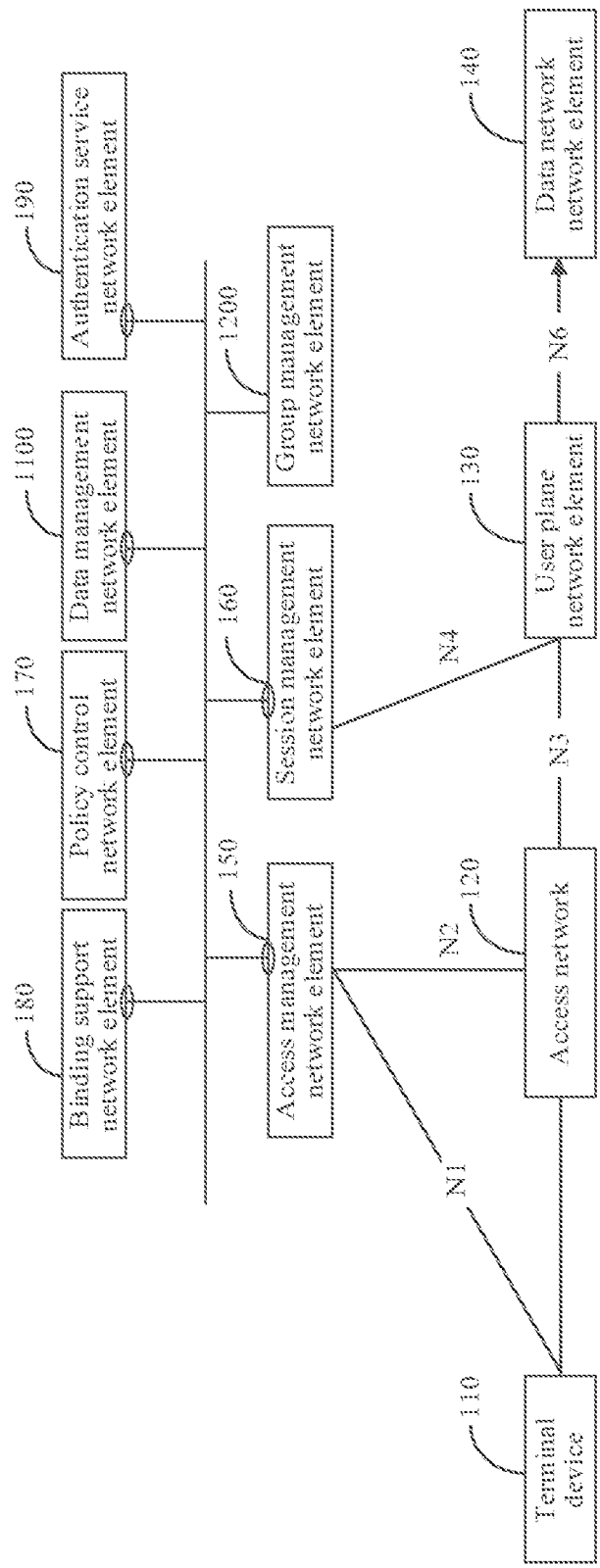
FIG. 1 is a schematic structural diagram of an example of a communications system according to this application.

FIG. 1 shows a network architecture used in an embodiment of this application. Network elements that may be in the network architecture are separately described.

1. A terminal device 110 may include various handheld devices, vehicle-mounted devices, wearable devices, and computing devices that have a wireless communication function, or other processing devices connected to a wireless modem, and terminals in various forms, such as a mobile station (MS), a terminal, user equipment (UE), and a soft client. For example, the terminal device 110 may be a water meter, an electricity meter, or a sensor.

2. A (radio) access network ((R)AN) network element 120 is configured to provide a network access function for authorized terminal devices in a specific area, and can use transmission tunnels with different quality based on levels of the terminal devices, service requirements, and the like.

The (R)AN network element can manage radio resources and provide an access service for a terminal device, to forward a control signal and terminal device data between the terminal device and a core network. The (R)AN network element may also be understood as a base station in a conventional network.

It should be noted that the "network element" may also be referred to as an entity, a device, an apparatus, a module, or the like. This is not particularly limited in this application. In addition, in this application, for ease of understanding and description, the description of the "network element" is omitted in some descriptions. For example, a (R)AN network element is briefly referred to as a (R)AN. In this case, the "(R)AN network element" should be understood as a (R)AN network element or a (R)AN entity. Same or similar cases are not described in the following.

3. A user plane network element 130 is used for packet routing and forwarding, quality of service (QoS) processing of user plane data, and the like.

In a 5G communications system, the user plane network element may be a UPF network element. In a future communications system, the user plane network element may still be a UPF network element, or may have another name. This is not limited in this application.

4. A data network 140 is configured to provide a network for data transmission.

In the 5G communications system, the data network may be a data network network element. In the future communications system, the data network may still be a data network network element, or may have another name. This is not limited in this application.

5. An access management network element 150 is mainly configured to perform mobility management, access management, and the like, and may be configured to implement other functions, for example, lawful interception and access authorization/authentication, other than session management in functions of a mobility management entity (MME).

In the 5G communications system, the access management network element may be an access and mobility management function (AMF) network element. In the future communications system, the access management network element may still be an AMF network element, or may have another name. This is not limited in this application.

6. A session management network element 160 is mainly configured to manage a session, assign and manage an Internet Protocol (IP) address of a terminal device, select an endpoint that can manage a UPF interface and a policy control and charging function interface, notify downlink data, and the like.

In the 5G communications system, the session management network element may be a SMF network element. In the future communications system, the session management network element may still be an SMF network element, or may have another name. This is not limited in this application.

7. A policy control network element 170 is configured to guide a unified policy framework of network behavior, and provide policy rule information for a control plane function (CPF) network element (for example, an AMF or an SMF network element), and the like.

In a 4th generation (4G) communications system, the policy control network element may be a policy and charging rules function (PCRF) network element. In the 5G communications system, the policy control network element may be a policy control function (PCF) network element. In the future communications system, the policy control network element may still be a PCF network element, or may have another name. This is not limited in this application.

8. A binding support network element 180 is configured to search for a PCF associated with a session.

In the 5G communications system, the binding support network element may be a binding support function (BSF) network element. In the future communications system, the binding support network element may still be a BSF network element, or may have another name. This is not limited in this application.

9. An authentication server 190 is configured to authenticate a service, generate a key to implement bidirectional authentication for a terminal device, and support a unified authentication framework.

In the 5G communications system, the authentication server may be an authentication server function (AUSF) network element. In the future communications system, the authentication server may still be an AUSF network element, or may have another name. This is not limited in this application.

10. A data management network element 1100 is configured to process a terminal device identifier, perform access authentication, registration, and mobility management, and the like.

In the 5G communications system, the data management network element may be a unified data management (UDM) network element. In the future communications system, the data management network element may still be a ULM network element, or may have another name. This is not limited in this application.

11. An application network element is configured to perform application-affected data routing, access a network exposure function (NEF) network element, interact with a policy framework to perform policy control, and the like.

In the 5G communications system, the application network element may be an application function (AF) network element. In the future communications system, the application network element may still be an AF network element, or may have another name. This is not limited in this application.

12. A network storage network element is configured to maintain real-time information of all network function services in a network.

In the 5G communications system, the network storage network element may be a network repository function (NRF) network element. In the future communications system, the network storage network element may still be an NRF network element, or may have another name. This is not limited in this application.

13. A group management network element is configured to be responsible for creation and member management of a mobile network local area network (LAN), for example, a 5G LAN group (specifically, a terminal device group).

In the 5G communications system, the group management network element may also be a GMF network element.

It should be noted that the "network element" may also be referred to as an entity, a device, an apparatus, a module, or the like. This is not particularly limited in this application. In addition, in this application, for ease of understanding and description, the description of the "network element" is omitted in some descriptions. For example, a GMF network element is briefly referred to as a GMF. In this case, the "GMF" should be understood as a GMF network element or a GMF entity. Same or similar cases are not described in the following.

It may be understood that the foregoing network element or function may be a network element in a hardware device, a software function running on dedicated hardware, or a virtualization function instantiated on a platform (for example, a cloud platform).

For ease of description, in this application, apparatuses GMF, SMF, UPF, and NRF are used as an example to describe a session establishment method. All GMFs subsequently described in this application may be replaced with group management network element, all SMFs may be replaced with session management network elements, all UPFs may be replaced with user plane network elements, and all NRFs may be replaced with network storage network elements. For an implementation method in which an apparatus is a chip in a GMF, a chip in an SMF, or a chip in a UPF entity, refer to specific descriptions in which the apparatus is separately a (IMF entity, an SMF entity, or a UPF entity. Details are not described again.

In this application, any two terminal devices in a same terminal device group may communicate with each other through a LAN, for example, a 5G LAN, provided by a mobile network. In other words, the communication between any two terminal devices in the same terminal device group does not need forwarding by a server.

The "5G LAN" may be a LAN formed by using a 5G system, for example, by using a communication resource (for example, a time-frequency resource) and a network device (for example, a base station, a core network device, or a forwarding device) provided by the 5G system.

Specifically, a 5G network needs to support a virtual LAN service, in other words, the 5G network needs to provide a plurality of types of transmission services for terminals in a set. For example, the transmission services include services that are based on an IP, Ethernet, or other non-IP technologies between networks, to ensure mutual communication between the terminals in the set.

In this application, a GMF network element may determine a group to which each terminal device in a communications system belongs. For example, the communications system may include a plurality of groups, and each group includes at least one terminal device. The GMF network element may allocate a group identifier to each group, in other words, the group identifier of each group may be used to uniquely indicate the group in the communications system. In addition, the GMF network element may record and store a terminal identifier (UE ID) of a terminal included in each group.

As an example instead of a limitation, in this application, at least one of the following information may be used as the UE ID an IP address, an IP port, a media access control (MAC) address, a mobile phone number, an international mobile subscriber identity (IMSI), an international mobile equipment identity (IMEI), a radio network temporary identity (RNTI), and the like.

As an example instead of a limitation, a method and a process of creating a group by using a GMF may include the following steps.

a. A terminal device (or a UE) sends a non-access stratum (NAS) message to an AMF. The message includes an AMF information (message) and a group service request, and the group service request may also be referred to as a LAN service request.

Therefore, the AMF selects a GMF based on the AMF message. Content included in the AMF message may be an identifier of the GMF, or may be information indicating a request type. For example, the information indicating the request type may indicate that the message is a request for a LAN service.

Then, the AMF determines, based on the request type, that the message needs to be forwarded to the (IMF.

In other words, the LAN service request is a message sent by the UE to the GMF, and is forwarded by the AMF. The LAN service request message includes a terminal device identifier and the information indicating the request type, and further includes a terminal device list (for example, the list may include a plurality of terminal device identifiers). In other words, UE indicated by a terminal device identifier in the terminal device list may be understood as peer UE with which the U, that sends the LAN service request expects to communicate in the LAN service, or, UE indicated by a terminal device identifier in the terminal device list may be understood as UE in an LAN communication group to which the UE that sends the LAN service request is to be added.

b. The AMF determines, based on the AMF message, that the message needs to be forwarded to the GMF. For example, the AMF sends a network function query request to an NRF, to request to query for a network function that provides a LAN service. The NRF determines that the GMF provides the LAN service, and sends an access address (for example, an IP address or an identifier) of the GMF to the AMF. The AMF forwards the LAN service request to the GMF.

c. The GMF requests subscription data of the UE from a UDM. The subscription data of the UE includes LAN service indication information of the UE, for example, indicating that the UE is allowed to use a LAN service. The GMF determines, based on the subscription data of the UE, that the UE is allowed to use the LAN service.

d. If the UE includes a UE list in the request, and the UE list includes a plurality of terminal device identifiers, the GMF further requests, from the UDM, subscription data of UEs in the UE list, and determines, based on the subscription data, whether these UEs are allowed to use the LAN service.

e. Optionally, the GMF may further verify security of an identity of the UE, to determine that the UE is an authorized user.

f. The GMF generates a group identifier, for example, the group identifier may be a virtual data network name dynamically created by the GMF for the UE.

Optionally, the GMF may further determine LAN credential information, the information is provided for an LMF during next access of the UE, and the LMF determines, based on the information, that the UE is an authorized LAN member. If the UE includes a UE list in the request, the LMF determines an accepted UE list based on a result of the step 4. The list includes identifiers of terminal devices that are allowed to use the LAN service (the UE provides a subset of the list).

g. The GMF sends a group service response to the AMF. The group service response includes a group identifier, a group credential, and an accepted terminal device list (accepted UE list). The group service response may also be referred to as a LAN service response, the group identifier may also be referred to as a LAN identifier (LAN ID), and the group credential may also be referred to as LAN credential.

h. The AMF forwards the message to the UE.

i. Optionally, in the steps i to m, if the GMF determines the accepted UE list, the GMF may determine to send the LAN ID and the LAN credential to specified UE in the accepted UE list. Specifically, the GMF sends the LAN ID and the LAN credential to the AMF, and specifies UE that needs to be paged by the AMF. An ID of the UE that needs to be paged corresponds to an ID of UE in the accepted UE list.

j. The AMF pages the specified UE.

k. The paged UE initiates a service request procedure to establish a connection with the AMF.

m. The AMF sends the LAN ID and LAN credential to the UE. In this way, a group establishment process is completed.

It should be understood that the foregoing group establishment process is merely an example for description, and this application is not limited thereto. All other methods and processes that can implement group establishment fall within the protection scope of this application.

In this network architecture, an N2 interface is a reference point between a (R)AN network element 120 and an AMF network element 160, and is configured to send a NAS message, and the like. An N3 interface is a reference point between the (R)AN network element 120 and an UPF network element 130, and is configured to transmit user plane data, and the like. An N4 interface is a reference point between an SMF network element 170 and the UPF network element 130, and is configured to transmit information such as tunnel identifier information of an N3 connection, data buffer indication information, and a downlink data notification message. An N6 interface is a reference point between the UPF network element 130 and a data network network element 140, and is configured to transmit user plane data, and the like. An N23 interface is a reference point between a network data analysis (NWDA) network element 1140 and a PCF network element 1110. If the AF network element is an AF network element in a network, the AF network element interacts with another network element by using the PCF network element 1110 or an NEF network element.

It should be understood that the network elements included in the communications systems listed above are merely examples for description, and this application is not limited thereto. For example, the network elements may further include but are not limited to an NEF network element, configured to securely open, to outside, a service, a capability, and the like that are provided by a 3rd Generation Partnership Project (3GPP) network function, a UDM network element, configured to perform user identifier processing, access authentication, registration, mobility management, and the like, and an NWDA network element, configured to collect and store information from a terminal device, a (R)AN network element, and another network entity (for example, an AMF network element), analyze the information, generate user-related context information (which may be considered as application layer information), and distribute the application layer information.

It should be understood that the foregoing network architecture applied to this embodiment of this application is merely an example of a network architecture described from a perspective of a service architecture, and a network architecture applicable to this embodiment of this application is not limited thereto. Any network architecture that can implement functions of the foregoing network elements is applicable to this embodiment of this application.

For example, in some network architectures, network function entities such as an AMF, an SMF, a PCF, a GMF, and a UDM are all referred to as network function network elements. Alternatively, in some other network architectures, a set of network elements such as an AMF, an SMF, a PC, a GMF, and a UDM may be referred to as a CPF network element.

This embodiment of this application describes the embodiments with reference to a terminal device. The terminal device may also be referred to as UE an access terminal, a subscriber unit, a subscriber station, a MS, a mobile console, a remote station, a remote terminal, a mobile device, a user terminal, a terminal, a wireless communications device, a user agent, or user device. The terminal device may be a station (ST) in a WLAN, and may be a cellular phone, a cordless phone, a session initiation protocol (SIP) phone, a wireless local loop (WLL) station, a personal digital assistant (IDA) device, a handheld device with a wireless communication function, a computing device, another processing device connected to a wireless modem, a vehicle-mounted device, an internet of vehicles terminal, a computer, a laptop computer, a handheld communications device, a handheld computing device, a satellite wireless device, a wireless modem card, a television set-top box (STB), customer premises equipment (CPE), another device configured to perform communication in a wireless system, or a next generation communications system, for example, a terminal device in a 5G network, or a terminal device in a future evolved public land mobile network (PLMN).

As an example instead of a limitation, in this embodiment of this application, the terminal device may alternatively be a wearable device. The wearable device may also be referred to as a wearable intelligent device, and is a generic term for wearable devices such as glasses, gloves, watches, clothes, and shoes that are developed by applying wearable technologies to intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of AF and need to work with other devices such as smartphones, for example, various smart bands or smart jewelry for monitoring physical signs.

In addition, in this embodiment of this application, the terminal device may alternatively be a terminal device in an internet-of-things (IoT) system. IoT is an important part of future development of information technologies, and a main technical feature of IoT is to connect a thing to a network by using a communications technology, thereby implementing an intelligent network for interconnection between a person and a machine or between one thing and another.

The embodiment of this application describes the embodiments with reference to a control device. In this embodiment of this application, the control device can obtain related information of the terminal device and the forwarding device, and can select an entity or a module of the forwarding device for the terminal device. Subsequently, a function of the control device is described in detail with reference to a process of selecting the forwarding device. As an example instead of a limitation, in this embodiment of this application, the control device may be configured in a core network. For example, the control device may be the SMF or the GMF.

The embodiment of this application describes the embodiments with reference to a forwarding device. In this embodiment of this application, the forwarding device may be an entity or a module that has a forwarding function. Subsequently, a function of the forwarding device is described in detail with reference to a data transmission process.

The following describes in detail a configuration manner of the forwarding device in this embodiment of this application. In this embodiment of this application, the forwarding device is configured in a mobile network. In other words, the forwarding device may be a network element in the mobile network, or the forwarding device may be a function module on a network element in the mobile network.

As an example instead of a limitation, the forwarding device may be configured in any one of the following manners.

Manner 1.

In this embodiment of this application, the forwarding device may be disposed on a core network device or is a core network device. In other words, the core network device may have the function of the forwarding device in this application, and may perform actions of the forwarding device.

Main functions of a core network are to provide a user connection, manage a user, complete service carrying, and act as a bearer network to provide an interface to an external network. Establishment of the user connection includes functions such as mobility management, call management (CM), switching/routing, and recording notification. User management includes user description, QoS, user communication record (accounting), virtual home environment (VHE), and security (an authentication center provides corresponding security measures, including security management for mobile services and security processing for external network access). A bearer connection (access) includes a public switched telephone network (PSTN) to outside, an external circuit data network and a packet data network, an internet and an intranet, a cell phone short message service (SMS) server of the mobile network, and the like.

Basic services that can be provided by the core network include mobile office, e-commerce, communication, an entertainment service, a travel and location-based service, a telemetry service, a simple message transfer service (monitoring and control), and the like.

As an example instead of a limitation, the core network device may include function units such as an AMF, a SM, a PCF, and a UPF. These function units may work independently, or may be combined together to implement some control functions. For example, the AMF the SMF, and the PCF may be combined together as a management device to implement access control and mobility management functions such as access authentication, security encryption, and location registration of the terminal device, SMFs such as establishment, release, and change of a user plane transmission path, and functions such as analysis of slice-related data (such as congestion) and terminal device-related data. The UPF mainly implements functions such as routing and forwarding of user plane data, for example, filtering data packets of the terminal device, transmitting/forwarding data, controlling a rate, and generating charging information.

For example, in this application, the forwarding device may include the UPF.

The UPF mainly provides service processing functions of a user plane, including routing a service, forwarding a packet, anchoring, mapping and executing QoS, identifying an uplink identifier and routing the identifier to a data network, buffering a downlink packet, triggering a notification of downlink data arrival, and connecting to an external data network.

It should be understood that the foregoing UPF is merely an example of a function entity that can be used as the forwarding device in the core network. This is not particularly limited in this application, and any other function entity that can directly communicate with the terminal device or can communicate with the terminal device by using an access network device may be used as the forwarding device in this application.

Manner 2.

In this embodiment of this application, the forwarding device may be disposed on an access network device or is an access network device. In other words, the access network device may have the function of the forwarding device in this application, and may perform the actions of the forwarding device.

An access network includes a series of transmission entities (such as line equipment and transmission facilities) between a service node interface (SNI) and a user-network interface (UNI), is an implementation system that provides a required transmission bearer capability for a telecommunication service, and can be configured and managed through a management interface (Q3). In principle, there is no limit on types and quantities of UNIs and SNIs that can be supported by the access network. The access network does not interpret signaling. The access network can be considered as a transport network that is independent of services and applications. The access network mainly implements cross-connection, multiplexing, and transmission functions.

The access network may include an access network/(R) AN device, and is a network including a plurality of 5G-RAN nodes. The 5G-RAN node may be an access point, a next-generation new base station, a next-generation evolved base station, a transmission receive point (TRP), a transmission point (TP), or another access node. The 5G-RAN node may be divided into a central unit (CU) and a distributed unit (DU) inside the node.

In addition, the access network device may alternatively be a base transceiver station (BTS) in a (ISM or a CDMA, a base station (NB) in a WCDMA, an evolved NodeB (eNB) in an LTE, a relay station, an access point, an access network device in a vehicle-mounted device, a wearable device, and a future 5G network, an access network device in a future evolved PLMN network, or the like. This is not particularly limited in this application.

It should be noted that, in this embodiment of this application, the access network device may serve a cell. The terminal device communicates with the access network device on a transmission resource (for example, a frequency domain resource or a spectrum resource) used by the cell. The cell may be a cell corresponding to the access network device (for example, a base station). The cell may belong to a macro base station, or a base station corresponding to a small cell. The small cell herein may be a metro cell, a micro cell, a pico cell, a femto cell, or the like. These small cells have features of small coverage and low transmit power, and are suitable for providing a high-rate data transmission service.

In addition, a plurality of cells may work at the same time in a same frequency band on a carrier in an LTE system or a 5G system. In some special scenarios, the concept of the carrier is considered equivalent to that of the cell. For example, in a carrier aggregation (CA) scenario, when a secondary carrier is configured for UE, both a carrier index of the secondary carrier and a cell identifier (Cell ID) of a secondary cell working on the secondary carrier are carried. In this case, it may be considered that the concept of the carrier is equivalent to that of the cell. For example, that the LE accesses a carrier is equivalent to that the UE accesses a cell.

Manner 3.

The forwarding device may alternatively be a device independently configured in the mobile network, and the forwarding device may be communicatively connected to an access network device or a core network device (for example, connected in a wired manner or a wireless manner), so that the forwarding device can communicate with the terminal device by using the access network device or the core network device.

It should be understood that the foregoing configuration manners of the forwarding device are merely examples for description, and this application is not limited thereto. When the function of the forwarding device in this application can be implemented, a specific configuration form of the forwarding device may be randomly changed. For example, the forwarding device may also be configured in a device, for example, a gateway device or a router.

In addition, in this application, the following types of forwarding devices may be included.

Type 1, a forwarding device capable of supporting a group service (or a 5G LAN service). The forwarding device of this type can identify a destination address carried in a packet, for example, a destination IP address or a destination MAC address, so that the packet can be forwarded (for example, through an access network device) to a terminal device indicated by the destination address. In other words, the forwarding device of this type does not directly send a packet received from the terminal device to an external server. Subsequently, a data forwarding process of the forwarding device of the type 1 is described in detail.

Type 2, a forwarding device that cannot support a group server. The forwarding device of this type does not perform a process of identifying a destination address carried in a packet, but directly sends a packet received from the terminal device to the external server. It should be noted that the forwarding device of the type 2 may be converted into the forwarding device of the type 1 by installing and executing a program for probing a destination address of a packet. That is, in this application, the type of each forwarding device may be randomly changed by a network management device, a network administrator, a telecom operator, or a device manufacturer based on a network structure and a service layout.

Figure 2:
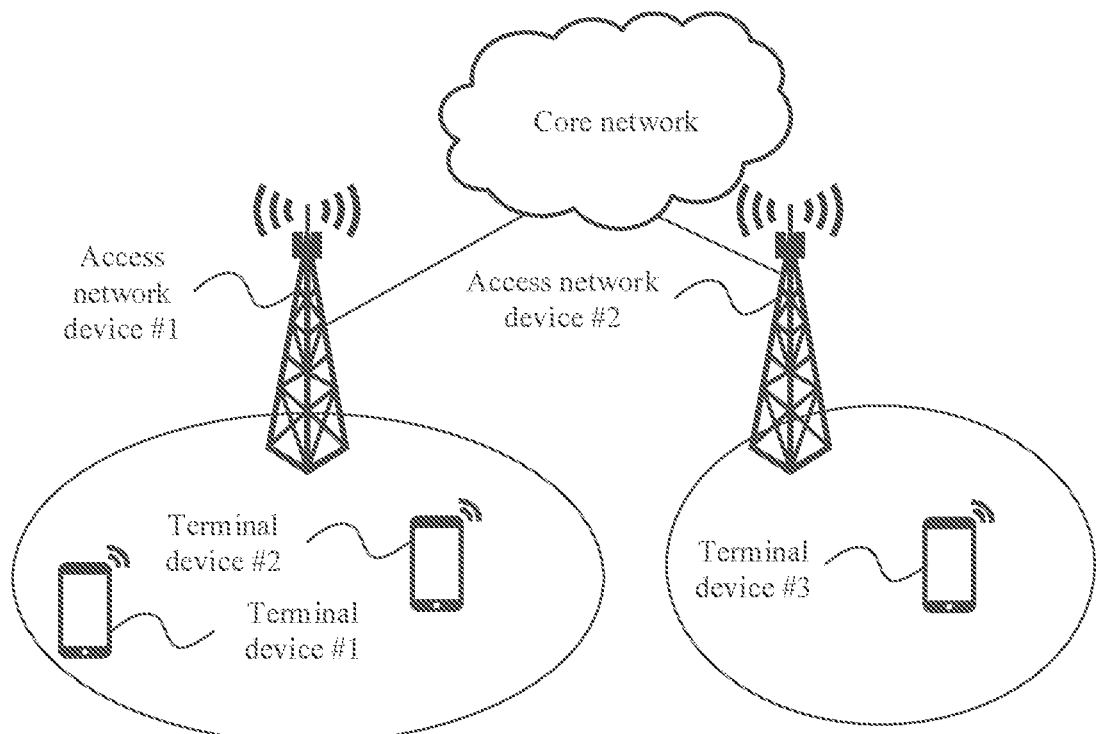
FIG. 2 is a schematic diagram of an example of a communication scenario according to this application.

FIG. 2 is a schematic diagram of an example of a communication scenario according to this application. As shown in FIG. 2, a terminal device #1 and a terminal device #2 are located in a cell provided by an access network device #1 (or a forwarding device #1), and a terminal device #3 is located in a cell provided by an access network device #2 (or a forwarding device #2).

The terminal device #1, the terminal device #2, and the terminal device #3 belong to a same terminal device group.

The terminal device group limits a group of terminal devices that can perform data communication by using a 5G LAN service. In other words, terminal devices belonging to a same terminal device group can perform data communication by using the 5G LAN service. Terminal devices belonging to different terminal device groups cannot perform data communication by using the 5G LAN service. The terminal device group may be, for example, a 5G LAN group or a 5G LAN virtual network.

When the terminal device #1 needs to send data to the terminal device #2, the access network device #1 may be used as a forwarding device in this application, and can directly send the data to the terminal device #2.

When the terminal device #1 needs to send data to the terminal device #3, the access network device #1 may send the data to a forwarding device (for example, a UPF) in a core network, the forwarding device in the core network sends the data to the access network device #2, and the access network device #2 sends the data to the terminal device #3.

Each access network device may include one or more antennas. In addition, the access network device may additionally include a transmitter chain and a receiver chain. A person of ordinary skill in the art can understand that the transmitter chain and the receiver chain each may include a plurality of components (for example, a processor, a modulator, a multiplexer, a demodulator, a demultiplexer, or an antenna) related to signal sending and receiving.

Each access network device may communicate with a plurality of terminal devices.

The terminal device may be, for example, a cellular phone, a smartphone, a portable computer, a handheld communications device, a handheld computing device, a satellite radio apparatus, a global positioning system, a PDA, and/or any other appropriate device configured to perform communication in a wireless communications system.

The access network device may send data or information to the terminal device over a forward link (also referred to as a downlink), and receive data or information from the terminal device over a reverse link (also referred to as an uplink).

For example, in an FDD system, for example, the forward link and the reverse link may have different frequency bands.

For another example, in a TDD system and a full-duplex system, the forward link and the reverse link may have a same frequency band.

Each antenna (or an antenna group including a plurality of antennas) and/or area designed for communication are/is referred to as a sector of the access network device.

For example, the antenna group may be designed to communicate with a terminal device in a sector within coverage of the access network device. The access network device may send signals to all terminal devices in a corresponding sector through a single antenna or a multi-antenna transmit diversity.

In a process in which the access network device communicates with the terminal device over the forward link, a transmit antenna of the access network device may improve a signal-to-noise ratio of the forward link through beamforming.

In addition, interference to a mobile device in an adjacent cell when the access network device sends signals through beamforming to the terminal devices that are randomly scattered in the related coverage is less than that in a manner in which the access network device sends, through a single antenna or a multi-antenna transmit diversity, signals to all terminal devices served by the access network device.

In a given time, the network device or the terminal device may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of the data, and the transport block may be segmented to generate a plurality of code blocks.

In addition, the communications system 100 may be a PLMN network, a D2D network, an M2M network, an IoT network, a V2X network, or another network. FIG. 2 is only a simplified schematic diagram of an example, and the network may further include another access network device, or a network element in another mobile network, which is not shown in FIG. 2.

In this embodiment of this application, the terminal device or the forwarding device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more of computer operating systems implementing service processing by using a process, for example, a LINUX operating system, a UNIX operating system, an ANDROID operating system, an IOS operating system, or a WINDOWS operating system. The application layer includes applications such as a browser, an address book, word processing software, and instant communications software. In addition, a specific structure of an execution body of a method provided in the embodiments of this application is not specifically limited in this embodiment of this application, provided that a program that records code for the method provided in the embodiments of this application can be run to perform communication according to the method provided in the embodiments of this application. For example, the execution body of the method provided in the embodiments of this application may be a terminal device, a network device, or a function module that is in a terminal device or a network device and that can invoke and execute the program.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk or a magnetic tape), an optical disc (for example, a compact disc (CD), and a digital versatile disc (DVD)), a smart card, and a flash memory component (for example, erasable programmable read-only memory (PROM), and a card, stick, or key drive). In addition, various storage media described in this specification may represent one or more devices and/or other machine-readable media that are configured to store information. The term "machine-readable media" may include but is not limited to a radio channel, and various other media that can store, contain, and/or carry an instruction and/or data.

It should be noted that in this embodiment of this application, a plurality of applications may be run at the application layer. In this case, an application for performing the method in the embodiments of this application and an application configured to control a receive end device to implement an action corresponding to received data may be different applications.

The following describes in detail a process in which a control device selects a forwarding device for a terminal device.

Figure 3:
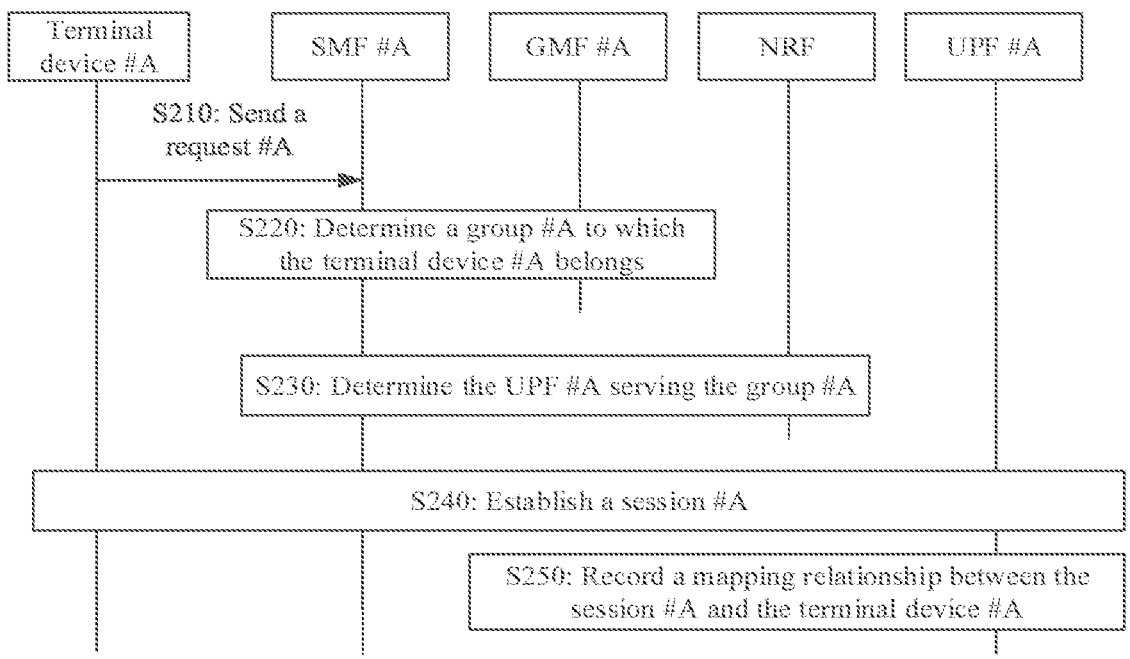
FIG. 3 is a schematic interaction diagram of an example of a forwarding device selection method according to this application.

FIG. 3 is a schematic interaction diagram of a forwarding device selection method 200 according to an embodiment of this application. In addition, for ease of understanding, in the method 200, as an example instead of a limitation, an example in which a UPF is used as a forwarding device and an SMF is used as a control device is used for description.

As shown in FIG. 3, in S210, a terminal device #A (an example of a first terminal device) may send a request #A (an example of first request information) to an SMF #A (an example of the control device).

As an example instead of a limitation, a communications system may include one or more SMF's. The SMF #A may be an SMF that can serve the terminal device #A. For example, the SMF #A may manage and control a session of the terminal device #A.

The request #A is used to indicate that the terminal device #A requests to access a group communication (or group communication type) service, for example, a 5G LAN service or a 5G LAN-type service.

In addition, the request #A may carry a UE ID of the terminal device #A, for example, an IP address of the terminal device #A, a MAC address of the terminal device #A, a mobile phone number of the terminal device #A, an IMSI of the terminal device #A, an IMEI of the terminal device #A, or an RNTI of the terminal device #A.

In addition, for example, the request #A may carry a service identifier of the group communication service, for example, a 5G LAN service identifier, which is used to indicate that a terminal device that sends a request carrying the identifier requests to access the group service.

For another example, the request #A may carry a group identifier in a specified format, so that the control device (for example, an SMF or a GMF) may determine that a terminal device that sends the request carrying the group identifier requests to access the group service.

The group identifier is used to identify a device group to which the terminal device #A belongs, and may be, for example, a 5G LAN group ID or a 5G LAN-virtual network ID.

As an example instead of a limitation, for example, the request #A may be, for example, a session establishment request. The session may be a protocol data unit (PDU) session.

It should be understood that the foregoing specific example of the request #A is merely an example for description, and this application is not limited thereto. Any other message or information that can enable the SMF to learn that the terminal device requests to access a group communication (or group communication type) service falls within the protection scope of this application.

In S220, the SMF #A may determine, based on the request #A, a group identifier (denoted as a group ID #A in the following for ease of understanding and description) of a group (denoted as a group #A in the following for ease of understanding and description) to which the terminal device #A belongs.

As an example instead of a limitation, the SMF #A may determine the group ID #A in any one of the following manners.

Manner 1.

In this application, the request #A may carry the group ID #A.

Specifically, in other words, as described above, when the terminal device #A has initiated a group establishment request, or the terminal device #A is added to a group that another terminal device requests to establish, the terminal device #A may obtain the group ID #A from the GMF.

In this case, the terminal device #A may carry the group ID #A in the request #A.

It should be noted that when the request #A carries the group ID #A, the request #A may carry the 5G LAN service indication, or may not carry the 5G LAN service indication. This is not particularly limited in this application.

Manner 2.

Specifically, in other words, as described above, when the terminal device #A has initiated a group establishment request, or the terminal device #A is added to a group that another terminal device requests to establish, the terminal device #A may obtain the group ID #A from the GMF.

In this case, the SMF #A may indicate the terminal device #A to report the group ID #A.

Manner 3.

In this application, the request #A may carry a device identifier (denoted as a UE ID #A in the following for ease of understanding and description) of the terminal device #A.

In this case, the SMF #A may send a request #B (an example of second request information) to a GMF #A. In addition, the request #B may carry the UE ID #A.

The request #B is used to indicate that the SMF requests the GMF to query a group identifier of a group to which a terminal device indicated by a terminal device identifier carried in the request #B belongs.

As an example instead of a limitation, the communications system may include one or more GMFs. The GMF #A may be a GMF that can serve the terminal device #A. For example, the GMF #A may manage and control a group to which the terminal device #A belongs.

Therefore, the GMF #A may determine the group #A and the group ID #A of the group #A based on the UE ID #A.

Then, the GMF #A may send, to the SMF #A, a response #C carrying the group ID #A.

Optionally, the response #C may further carry the UE ID #A, so that the SMF #A may determine, based on the UE ID #A, that the group ID #A is a group ID of the group to which the terminal device indicated by the UE ID #A belongs.

In S230, the SMF #A may allocate a UPI (an example of a target forwarding device, denoted as a UPF #A in the following for ease of understanding and description) to the terminal device #A based on the group ID #A.

In addition, it should be noted that, in this application, to ensure reliability and accuracy of the group communication service, the control device needs to ensure that a same forwarding device is allocated to terminal devices that request the group communication service and that are in terminal devices in a same group.

To be specific, the SMF #A needs to enable the determined UPF #A to meet the following condition.

All UEs (including the terminal device #A) that request to access a group service in the group #A establish a session with the UPF #A.

The following describes in detail a process in which the SMF #A determines the UPF #A.

As an example instead of a limitation, the SMF #A may determine the UPF #A in any one of the following manners.

Manner A.

In this application, a mapping relationship #A may be maintained in the SMF #A, and the mapping relationship #A may be used to indicate a UPF corresponding to each of a plurality of groups (or Group IDs).

It should be noted that, in this application, one group (or group ID) may correspond to only one UPF.

In addition, in this application, one UPF may correspond to one or more groups (or group IDs).

One UPF may provide a group service for the group corresponding to the UPF. For example, one UPF may establish a session with a terminal device in the group corresponding to the UPF, and transmit data of the group service by using the session.

Therefore, the SMF #A may query the mapping relationship #A, and determine the UPF corresponding to the group ID #A as the UPF #A.

It should be noted that, in this application, the terminal device #A may be the first terminal device that initiates a group communication service request in the group #A. In this case, the mapping relationship #A may not record the UPF corresponding to the group ID #A.

In this case, the SMF #A may send a request #D (an example of a query request) to a management device (for example, an NRF) of the UPF.

The request #D may be used to indicate the SMF to request the NRF to allocate a UPF capable of supporting a group communication service (namely, the type #1).

For example, the request #D may carry the group ID #A. The NRF may determine, based on the group ID carried in the request #D, that the request is used to request the NRF to allocate a UPF capable of supporting a group service.

For another example, the request #D may carry a service identifier of the group communication service, for example, a 5G LAN service identifier (indication). The 5G LAN service indication may be used to indicate that the request carrying the service identifier is used to request the NRF to allocate a UPF capable of supporting a group service.

Therefore, the NRF may select a UPF from the UPFs whose type is the type 1 as the UPF #A.

Then, the NRF may send, to the SMF #A, a response #E carrying an identifier of the UPF #A.

Optionally, the response #E may further carry the group ID #A, so that the SMF #A may determine, based on the group ID #A, that the UPF #A is a UPF allocated to the group indicated by the group ID #A.

In addition, the SMF #A may record a correspondence between the group ID #A and the UPF #A as the mapping relationship #A.

Alternatively, the SMF #A may pre-store information about one or more UPFs capable of supporting the group communication service (namely, the type #1), so that the SMF #A may select one UPF from the stored UPFs of the type #1 as the UPF #A.

The information that is about the UPFs that can support the group communication service (namely, the type #1) and that is pre-stored in the SMF #A may be sent by the NRF to the SMF #A in advance, or may be configured by a telecom operator or a network administrator. This is not particularly limited in this application.

Manner B.

In the SMF #A may send a request #F (an example of a query request) to a management device (for example, an NRF) of the UPF. The request #F carry the group ID #A.

The request #F is used to indicate that the SMF #A requests the NRF to allocate a UPF to a group indicated by the group ID #A.

For example, the request #F may carry a service identifier of the group communication service, for example, a 5G LAN service identifier (indication). The 5G LAN service indication may be used to indicate that the request carrying the service identifier is used to request to allocate a UPF capable of supporting a group service.

For another example, the NRF may determine, based on the group ID carried in the request #F, that the request is used to request the NRF to allocate a UPF capable of supporting a group service.

In this application, a mapping relationship #B may be maintained in the NRF, and the mapping relationship #B may be used to indicate a UPF corresponding to each of a plurality of groups (or group IDs).

It should be noted that, in this application, one group (or group ID) may correspond to only one UPF.

In addition, in this application, one UPF may correspond to one or more groups (or group IDs).

One UPF may provide a group service for the group corresponding to the UPF. For example, one UPF may establish a session with a terminal device in the group corresponding to the UPF, and transmit data of the group service by using the session.

Therefore, the NRF may query the mapping relationship #B, and determine the UPF corresponding to the group ID #A as the UPF #A.

It should be noted that, in this application, the terminal device #A may be the first terminal device that initiates a group communication service request in the group #A. In this case, the mapping relationship #B may not record the UPF corresponding to the group ID #A.

In this case, the NRF may select a UPF from the UPFs whose type is the type 1 as the UPF #A.

In addition, the NRF may record a correspondence between the group ID #A and the UPF #A in the mapping relationship #A.

Then, the NRF may send, to the SMF #A, a response #G carrying the identifier of the UPF #A.

Optionally, the response #G may further carry the group ID #A, so that the SMF #A may determine, based on the group ID #A, that the UPF #A is a UPF allocated to the group indicated by the group ID #A.

In S240, the SMF #A may control the UPF #A to establish a session (denoted as a session #A), for example, a PDU session, with the terminal device #A.

In S250, the UPF #A may record a mapping relationship between the session #A and the terminal device #A.

Optionally, in this application, during session establishment, the SMF #A or the terminal device #A may send indication information #H to the UPF #A, and the indication information is used to indicate that the terminal device #A requests to access the group communication service by using the established session.

In addition, the UPF #A may configure a distinguishing identifier for the session #A based on the indication information #H, and the distinguishing identifier is used to indicate that the session #A is used for the group communication service, or the distinguishing identifier is used to indicate that data carried by the session #A is data of the group communication service.

Optionally, the mapping relationship between the session #A and the terminal device #A may further include an identifier of the group #A (for example, a 5G LAN group ID or a 5G LAN-virtual network ID of the group #A). The identifier of the group #A may be used to indicate that the session #A belongs to a group communication service of the group #A, or the identifier of the group #A may be used to indicate that the session #A is used to carry data of the group communication service of the group #A.

According to the forwarding device selection method provided in this application, terminal devices in a same group can establish sessions with a same forwarding device, so that group service access between the terminal devices in the group can be completed by using the same forwarding device. Because data exchange of a group communication service does not need forwarding by a server, a transmission latency of the service can be reduced, to improve user experience, and improve communication efficiency.

Figure 4:
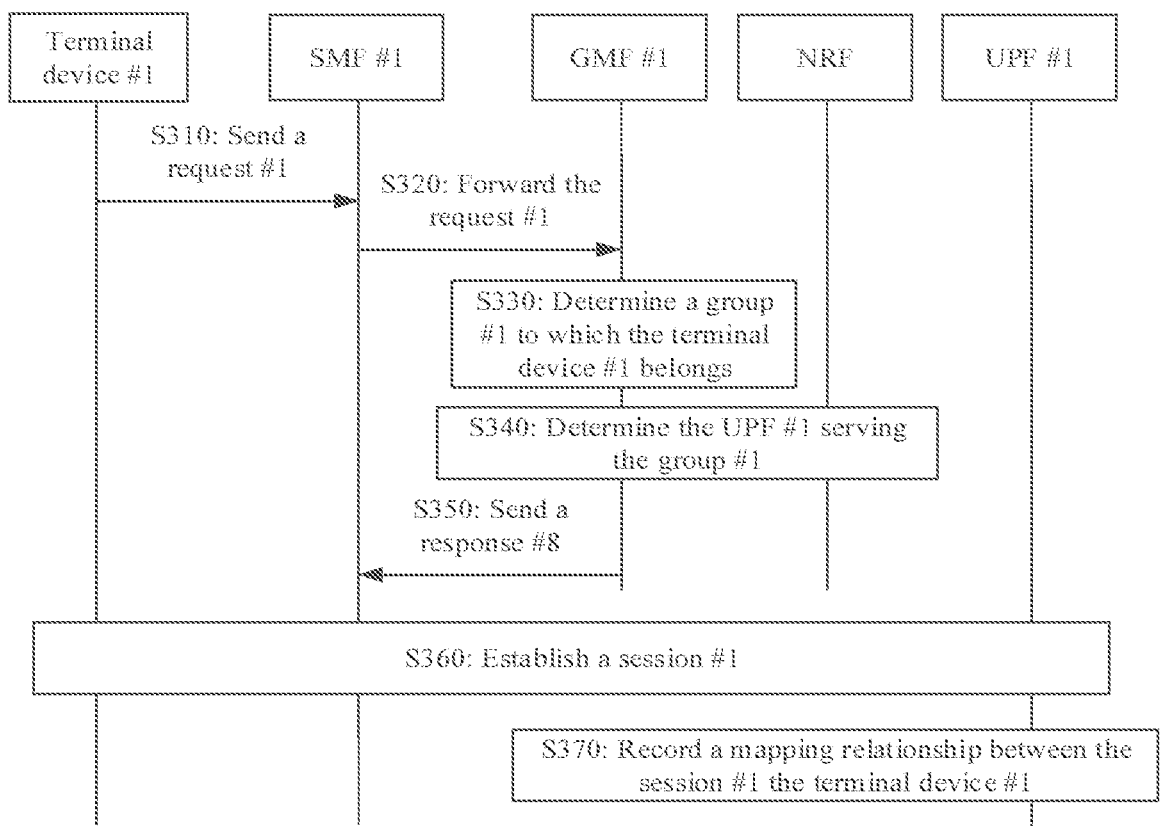
FIG. 4 is a schematic interaction diagram of another example of a forwarding device selection method according to this application.

FIG. 4 is a schematic interaction diagram of a forwarding device selection method 300 according to an embodiment of this application. In addition, for ease of understanding, in the method 300, as an example instead of a limitation, an example in which a UPF is used as a forwarding device and a GMF is used as a control device is used for description.

As shown in FIG. 4, in S310, a terminal device #1 (an example of a first terminal device) may send a request #1 (another example of first request information) to an SMF 41 (an example of a control device).

As an example instead of a limitation, a communications system may include one or more SMFs. The SMF #1 may be an SMF that can serve the terminal device #1. For example, the SMF #1 may manage and control a session of the terminal device #1.

The request #1 is used to indicate that the terminal device #1 requests to access a group communication (or group communication type) service, for example, a 5G LAN service.

In addition, the request #1 may carry a UE ID of the terminal device #1, for example, an IP address of the terminal device #1, a MAC address of the terminal device #1, a mobile phone number of the terminal device #1, an IMSI of the terminal device #1, an IML of the terminal device #1, or an RNTI of the terminal device #1.

In addition, for example, the request #1 may carry a service identifier of the group communication service, for example, a 5G LAN service identifier (indication), and the 5G LAN service indication may be used to indicate that a terminal device that sends a request carrying the identifier requests to access the group service.

For another example, the request #1 may carry a group identifier in a specified format, so that the control device (for example, an SMF or a GMF) may determine that a terminal device that sends the request carrying the group identifier requests to access the group service.

As an example instead of a limitation, for example, the request #1 may be, for example, a session establishment request. The session may be a PDU session.

It should be understood that the foregoing specific example of the request #1 is merely an example for description, and this application is not limited thereto. Any other message or information that can enable the SMF and the GMF to learn that the terminal device requests to access a group communication (or group communication type) service falls within the protection scope of this application.

In S320, after learning that the request #1 requests to establish a session used for the group communication service, the SMF #1 may forward the request #1 to a GMF #1.

As an example instead of a limitation, the communications system may include one or more GMFs. The GMF #1 may be a GMF that can serve the terminal device #1. For example, the GMF #1 may manage and control a group to which the terminal device #1 belongs.

In S330, the SMF #1 may determine, based on the request #1, a group identifier (denoted as a group ID 41 in the following for ease of understanding and description) of a group (denoted as a group #1 in the following for ease of understanding and description) to which the terminal device #1 belongs.

As an example instead of a limitation, the GMF #1 may determine the group ID #1 in any one of the following manners.

Manner 4.

In this application, the request #1 may carry the group ID #1.

Specifically, in other words, as described above, when the terminal device #1 has initiated a group establishment request, or the terminal device #1 is added to a group that another terminal device requests to establish, the terminal device #1 may obtain the group ID #1 from the GMF.

In this case, the terminal device #1 may carry the group ID #1 in the request #1.

It should be noted that when the request #1 carries the group ID #1, the request #1 may carry the 5G LAN service indication, or may not carry the 5G LAN service indication. This is not particularly limited in this application.

Manner 5.

In this application, the request #1 may carry a device identifier (denoted as a UE ID #1 in the following for ease of understanding and description) of the terminal device #1.

In this case, the GMF #1 may determine the group #1 and the group ID #1 of the group #1 based on the UE ID #1.

In S340, the GMF #1 may allocate a UPF (an example of a target forwarding device, denoted as a UPF #1 in the following for ease of understanding and description) to the terminal device #1 based on the group ID #1.

In addition, it should be noted that, in this application, to ensure reliability and accuracy of the group communication service, the control device needs to ensure that a same forwarding device is allocated to terminal devices that request the group communication service and that are in terminal devices in a same group.

To be specific, the GMF #1 needs to enable the determined UPF #1 to meet the following condition.

All UEs (including the terminal device #1) that request to access a group service in the group #1 establish a session with the UPF #1.

The following describes in detail a process in which the GMF #1 determines the UPF #1.

As an example instead of a limitation, the GMF #1 may determine the UPF #1 in any one of the following manners.

Manner C.

In this application, a mapping relationship #1 may be maintained in the GMF #1, and the mapping relationship #1 may be used to indicate a UPF corresponding to each of a plurality of groups (or group IDs).

It should be noted that, in this application, one group (or group ID) may correspond to only one UPF.

In addition, in this application, one UPF may correspond to one or more groups (or group IDs).

One UPF may provide a group service for the group corresponding to the UPF. For example, one UPF may establish a session with a terminal device in the group corresponding to the UPF, and transmit data of the group service by using the session.

Therefore, the GMF #1 may query the mapping relationship #1, and determine the UPF corresponding to the group ID #1 as the UPF #1.

It should be noted that, in this application, the terminal device #1 may be the first terminal device that initiates a group communication service request in the group #1. In this case, the mapping relationship #1 may not record the UPF corresponding to the group ID #1.

In this case, the GMF #A may send a request #4 (an example of a query request) to a management device (for example, an NRF) of the UPF.

The request #4 may be used to indicate the (MF to request the NRF to allocate a UPF capable of supporting a group communication service (namely, the type #1).

For example, the request #4 may carry the group ID #1. The NRF may determine, based on the group ID carried in the request #4, that the request is used to request the NRF to allocate a UPF capable of supporting a group service.

For another example, the request #4 may carry a service identifier of the group communication service, for example, a 5G LAN service identifier (indication). The 5G LAN service indication may be used to indicate that the request carrying the service identifier is used to request the NRF to allocate a UPF capable of supporting a group service.

Therefore, the NRF may select a UPF from the UPFs whose type is the type 1 as the UPF #1.

Then, the NRF may send, to the SMF #1, a response #5 carrying an identifier of the UPF #1.

Optionally, the response #5 may further carry the group ID #1, so that the SMF #1 may determine, based on the group ID #1, that the UPF #1 is a UPF allocated to the group indicated by the group ID #1.

In addition, the GMF #1 may record a correspondence between the group ID #1 and the UPF #1 as the mapping relationship #1.

Alternatively, the GMF #1 may pre-store information about one or more UPFs capable of supporting the group communication service (namely, the type #1), so that the GMF #1 may select one UPF from the stored UPFs of the type #1 as the UPF #1.

The information that is about the UPFs capable of supporting the group communication service (namely, the type #1) and that is pre-stored in the GMF #1 may be sent by the NRF to the GMF #1 in advance, or may be configured by a telecom operator or a network administrator. This is not particularly limited in this application.

Manner D.

In the GMF #1 may send a request #6 (an example of a query request) to a management device (for example, an NRF) of the UPF. The request #6 carries the group ID #1.

The request #6 is used to indicate that the GMF #1 requests the NRF to allocate a UPF to the group indicated by the group ID #1.

For example, the request #6 may carry a service identifier of the group communication service, for example, a 5G LAN service identifier (indication). The 5G LAN service indication may be used to indicate that the request carrying the service identifier is used to request to allocate a UPF capable of supporting a group service.

For another example, the NRF may determine, based on the group ID carried in the request #6, that the request is used to request the NRF to allocate a UPF capable of supporting a group service.

In this application, a mapping relationship #2 may be maintained in the NRF, and the mapping relationship #2 may be used to indicate a UPF corresponding to each of a plurality of groups (or group IDs).

It should be noted that, in this application, one group (or group ID) may correspond to only one UPF.

In addition, in this application, one UPF may correspond to one or more groups (or group IDs).

One UPF may provide a group service for the group corresponding to the UPF. For example, one UPF may establish a session with a terminal device in the group corresponding to the UPF, and transmit data of the group service by using the session.

Therefore, the NRF may query the mapping relationship #2, and determine the UPF corresponding to the group ID #1 as the UPF #1.

It should be noted that, in this application, the terminal device #1 may be the first terminal device that initiates a group communication service request in the group #1. In this case, the mapping relationship #2 may not record the UPF corresponding to the group ID #1.

In this case, the NRF may select a UPF from the UPFs whose type is the type 1 as the UPF #1.

In addition, the NRF may record a correspondence between the group ID #1 and the UPF #1 in the mapping relationship #1.

Then, the NRF may send, to the GMF #1, a response #7 carrying the identifier of the UPF #1.

Optionally, the response #7 may further carry the group ID #1, so that the GMF #1 may determine, based on the group ID #1, that the UPF #1 is a UPF allocated to the group indicated by the group ID #1.

In S350, the GMF #1 may send, to the SMF #1, a response #8 carrying the identifier of the UPF #1.

Optionally, the response #8 may further carry the group ID #1, so that the SMF #1 may determine, based on the group ID #1, that the UPF #1 is a UPF allocated to the group indicated by the group ID #1.

In S360, the SMF #1 may control the UPF #1 to establish a session (denoted as a session #1), for example, a PDU session, with the terminal device #1.

In S370, the UPF #1 may record a mapping relationship between the session #1 and the terminal device #1.

Optionally, in this application, during session establishment, the SMF #1 or the terminal device #1 may send indication information #8 to the UPF #1, and the indication information is used to indicate that the terminal device #1 requests to access the group communication service by using the established session.

In addition, the UPF #1 may configure a distinguishing identifier for the session #1 based on the indication information #8, and the distinguishing identifier is used to indicate that the session #1 is used for the group communication service, or the distinguishing identifier is used to indicate that data carried by the session #1 is data of the group communication service.

Optionally, the mapping relationship between the session #1 and the terminal device #1 may further include an identifier of the group #1 (for example, a 5G LAN group ID or a 5G LAN-virtual network ID of the group #1). The identifier of the group #1 may be used to indicate that the session #1 belongs to a group communication service of the group #1, or the identifier of the group #1 may be used to indicate that the session #1 is used to carry data of the group communication service of the group #1.

According to the forwarding device selection method provided in this application, terminal devices in a same group can establish sessions with a same forwarding device, so that group service access between the terminal devices in the group can be completed by using the same forwarding device. Because data exchange of a group communication service does not need forwarding by a server, a transmission latency of the service can be reduced, to improve user experience, and improve communication efficiency.

It should be noted that when an access network device is used as the forwarding device, a network element, for example, an AMF, may be used as a control device. In addition, a method and a process of selecting the forwarding device by using the AMF may be similar to the processing process of the SMF #A or the GMF #1. To avoid repetition, detailed descriptions of the process are omitted herein.

The following describes in detail a process in which a forwarding device sends a packet of a group service.

Figure 5:
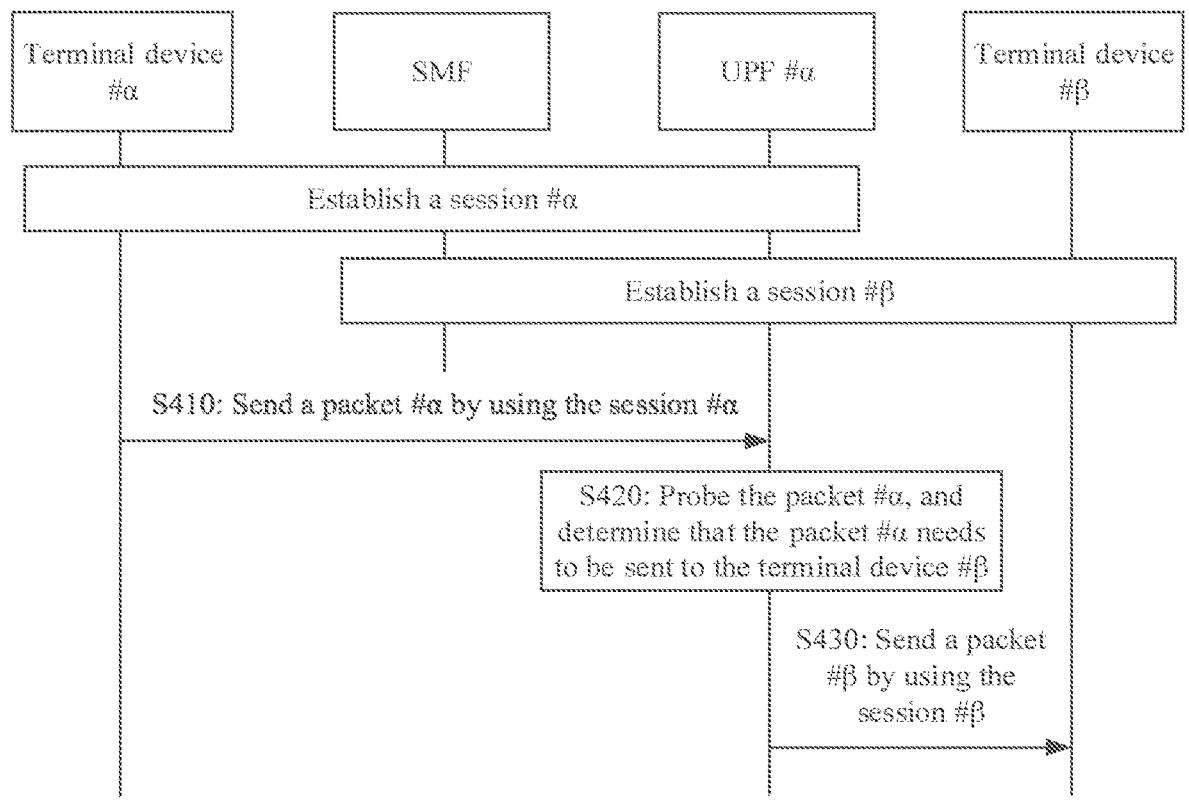
FIG. 5 is a schematic interaction diagram of an example of a packet sending method according to this application.

FIG. 5 is a schematic interaction diagram of a packet sending method 400 according to an embodiment of this application. In addition, for ease of understanding, in the method 400, as an example instead of a limitation, an example in which a UPF is used as a forwarding device is used for description.

As shown in FIG. 5, in S410, when a terminal device #α in a group #u sends data to a terminal device #β in the group #u by using a group communication service, a packet #u carrying the data may be generated.

A specified field #α of the packet #α may carry information about the terminal device #1.

In this application, the specified field #α may be a field used to carry related information of a destination of the packet, and related information (for example, a location, a name, or a format) of a specified field #α determined by the UPF is the same as related information of a specified field #α determined by the terminal device. In other words, the UPF and the terminal device can determine a same field in the packet as the specified field #α.

The specified field #α may be a field specified in a communications system or a communications protocol.

Alternatively, the specified field #α may be a resource determined by the UPF and the terminal device #α through negotiation.

As an example instead of a limitation, for example, the specified field #α may include a destination IP address field. Correspondingly, the information about the terminal device #β may include an IP address of the terminal device #β.

For another example, the specified field #α may include a destination MAC address field. Correspondingly, the information about the terminal device #β may include a MAC address of the terminal device #β.

For another example, the specified field #α may include a field used to carry a UE ID. Correspondingly, the information about the terminal device #β may include a UE ID of the terminal device #β, for example, the IP address of the terminal device #β, the MAC address of the terminal device #β, and a mobile phone number of the terminal device #β, an IMSI of the terminal device #β, an IMEI of the terminal device #β, or an RNTI of the terminal device #β.

Optionally, the packet #α may further carry a service identifier of the group communication service, for example, a 5G LAN service indication. The service identifier of the group communication service may be used to indicate that the packet #α is used to bear the group communication service.

Then, the terminal device #α sends the packet #α to a UPF #α by using a session #α.

The UPF #α is a UPF selected by a control device to serve the group #α (specifically, is a terminal device that accesses the group communication service and that is in the group #α). The session #α is a session that is established by the control device by controlling the terminal device #α and the UPF #α and that is used to carry data of the group communication service.

In addition, a process of selecting the UPF #α may be similar to the process described in the method 200 or 300. To avoid repetition, detailed descriptions of the process are omitted herein.

In S420, the UPF #α may probe the packet #α, to obtain information carried in the specified field #α.

Optionally, before S420 is performed, the UPF #α may further determine whether the packet #α needs to be probed.

For example, if a distinguishing identifier is configured for the session #α, the UPF #α may determine that the packet #α needs to be probed.

If no distinguishing identifier is configured for the session #α, the UPF #α may determine that the packet #α does not need to be probed.

A method and a process of configuring the distinguishing identifier may be similar to the process described in the method 200 or 300. To avoid repetition, detailed descriptions of the process are omitted herein.

For another example, if the packet #α carries the service identifier of the group communication service, for example, a 5G LAN service indication, the UPF #α may determine that the packet #α needs to be probed.

If the packet #α does not carry the service identifier of the group communication service, the UPF #α may determine that the packet #α does not need to be probed.

Then, the UPF #α may determine, based on the information (for example, the UE ID of the terminal device #β) carried in the specified field #α, that the packet #α needs to be sent to the terminal device #β. Then, the UPF #α determines, based on a mapping relationship that is between each terminal device (or each UE ID) and each session and that is maintained by the UPF #α, a session (denoted as a session #β) corresponding to the terminal device #β (or the UE ID of the terminal device #β).

Optionally, in this application, a same terminal device may belong to a plurality of terminal device groups. In this case, one terminal device may have a plurality of sessions.

In this case, a correspondence between each session and each group (or each group identifier, for example, a 5G LAN group ID or a 5G LAN-virtual network ID) may be further recorded in the mapping relationship maintained by the UPF #α. Each group identifier is used to show that a corresponding session belongs to a group communication service of a group indicated by the group identifier, or in other words, each group identifier is used to show that a corresponding session is used to carry data of a group communication service belonging to a group indicated by the group identifier.

Therefore, the UPF #α may determine, based on the mapping relationship, a group identifier (denoted as a group identifier #α) corresponding to the session #α.

In addition, a session that is recorded in the mapping relationship and that corresponds to the group identifier #α and the terminal device #β is determined as the session #β.

In S430, the UPF #α may send the session #α to the terminal device #β by using the session #β.

According to the packet sending method provided in this application, terminal devices in a same group can establish sessions with a same forwarding device, so that group service access between the terminal devices in the group can be completed by using the same forwarding device. Because data exchange of a group communication service does not need forwarding by a server, a transmission latency of the service can be reduced, to improve user experience, and improve communication efficiency.

Figure 6:
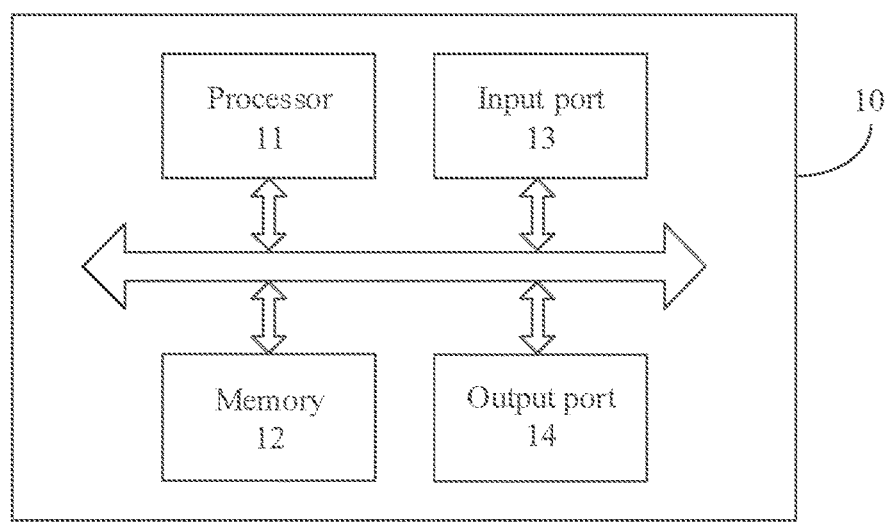
FIG. 6 is a schematic structural diagram of an example of a forwarding device selection apparatus according to this application.

According to the foregoing method. FIG. 6 is a schematic diagram 1 of a forwarding device selection apparatus (which may also be referred to as a device) 10 according to an embodiment of this application. As shown in FIG. 6, the apparatus 10 may be a control device (for example, the SMF #A or the GMF #1), or may be a chip or a circuit, for example, a chip or a circuit that may be disposed in a control device.

The apparatus 10 may include a processor 11 (an example of a processing unit) and a memory 12. The memory 12 is configured to store an instruction, and the processor 11 is configured to execute the instruction stored in the memory 12, to enable the apparatus 10 to implement the steps performed by the control device (for example, the SMF #A or the GMF #1) in the foregoing method (for example, the method 200 or the method 300).

Further, the apparatus 10 may further include an input port 13 (an example of a communications unit) and an output port 14 (another example of the communications unit). Further, the processor 11, the memory 12, the input port 13, and the output port 14 may communicate with each other through an internal connection path, to transmit a control signal and/or a data signal.

The memory 12 is configured to store a computer program. The processor 11 may be configured to invoke the computer program from the memory 12 and run the computer program, to control the input port 13 to receive a signal and the output port 14 to send a signal, thereby completing the steps performed by the control device in the foregoing methods.

The memory 12 may be integrated into the processor 11, or may be separated from the processor 11.

Optionally, if the apparatus 10 is a control device, the input port 13 is a receiver and the output port 14 is a transmitter. The receiver and the transmitter may be a same physical entity or different physical entities. When being a same physical entity, the receiver and the transmitter may be collectively referred to as a transceiver.

Optionally, if the apparatus 10 is a chip or a circuit, the input port 13 is an input interface and the output port 14 is an output interface.

In an implementation, it may be considered that functions of the input port 13 and the output port 14 are implemented by using a transceiver circuit or a dedicated transceiver chip. It may be considered that the processor 11 is implemented by using a dedicated processing chip, a processing circuit, a processor, or a general-purpose chip.

In another implementation, it may be considered that the control device provided in this embodiment of this application is implemented by using a general-purpose computer. To be specific, program code that is used to implement functions of the processor 11, the input port 13, and the output port 14 is stored in the memory 12, and a general-purpose processor implements the functions of the processor 11, the input port 13, and the output port 14 by executing the code in the memory 12.

In this embodiment of this application, the input port 13 is configured to receive first request information. The first request information is used to indicate that a first terminal device requests to access an group communication service.

The processor 11 is configured to determine a first terminal device group to which the first terminal device belongs, determine a target forwarding device that serves the first terminal device group, where the target forwarding device is a forwarding device capable of supporting an group communication service, and control the first terminal device to establish a session with the target forwarding device.

Optionally, the processor 11 is configured to obtain mapping relationship information, where the mapping relationship information is used to indicate a forwarding device corresponding to at least one terminal device group, the at least one terminal device group includes the first terminal device group, and the forwarding device can provide a group communication service for the corresponding terminal device group, and determine, based on the mapping relationship information, a forwarding device corresponding to the first terminal device group as the target forwarding device.

Optionally, the output port 14 is configured to send a query request to a NFR entity. The query request is used to request the NFR to query a forwarding device that is in a plurality of forwarding devices and that can support an group communication service.

The input port 13 is configured to receive response information sent by the NFR. The response information includes at least one alternative forwarding device capable of supporting an group communication service.

The processor 11 is configured to determine the target forwarding device from the at least one alternative forwarding device.

Optionally, the query request includes a group identifier of the first terminal device group, or the query request includes an group communication service identifier.

Optionally, the processor 11 is configured to record, in mapping relationship information, a mapping relationship between the first terminal device group and the target forwarding device. The mapping relationship information is used to indicate a forwarding device corresponding to each of at least one terminal device group. Each forwarding device can provide an group communication service for the corresponding terminal device group.

Optionally, the apparatus 10 is disposed on a SMF entity or is an SMF entity.

Optionally, the input port 13 is configured to receive a first message sent by the first terminal device, and the first message carries the first request information. The first message carries a device identifier of the first terminal device.

The output port 14 is configured to send second request information and a device identifier of the first terminal device to a GMF entity. The second request information is used to request the GMF to determine a terminal device group to which the first terminal device belongs.

The processor 11 is configured to determine the first terminal device group based on the group identifier, of the first terminal device group, sent by the GM F.

Optionally, the input port 13 is configured to receive a first message sent by the first terminal device, and the first message carries the first request information. The first message carries a group identifier of the first terminal device group.

The processor 11 is configured to determine the first terminal device group based on the group identifier of the first terminal device group.

Optionally, the apparatus 10 is disposed on a GMF or is a GMF.

Optionally, the input port 13 is configured to receive a second message sent by the SMF, and the second message carries the first request information. The second message carries the device identifier of the first terminal device.

The processor 11 is configured to determine the first terminal device group based on the device identifier of the first terminal device.

Optionally, the input port 13 is configured to receive a second message sent by the SMF and the second message carries the first request information. The second message carries the group identifier of the first terminal device group.

The processor 11 is configured to determine the first terminal device group based on the group identifier of the first terminal device group.

Optionally, the forwarding device includes a UPF entity.

The foregoing listed functions and actions of the modules or units in the apparatus 10 are merely examples for description. The modules or units in the apparatus 10 may be configured to perform actions or processing processes performed by the control device in the method 200 or 300. To avoid repetition, detailed descriptions are omitted herein.

For example, the processor 11 may perform the actions performed by the SMF #A in the foregoing S220, S230, and S240.

For another example, the processor 11 may perform the actions performed by the GMF #1 in the foregoing S330, S340, and S350.

For concepts, explanations, detailed descriptions, and other steps of the apparatus 10 that are related to the technical solutions provided in the embodiments of this application, refer to the descriptions of the content in the foregoing methods or other embodiments. Details are not described herein again.

In a possible implementation, with development of a system-on-chip (SoC) technology, all or some functions of the apparatus 10 are implemented by using the SoC technology, for example, implemented by using a control device function chip. The control device function chip integrates components such as a processor, a memory, and a communications interface. A program of a control device-related function is stored in the memory. The processor executes the program to implement related functions of a base station.

Optionally, the control device function chip can also read a memory outside the chip to implement the related functions of the base station.

It should be understood that the structure of the apparatus 10 shown in FIG. 6 is merely a possible form, but should not constitute any limitation to this embodiment of this application. In this application, there may be a base station structure in another form in the future.

Figure 7:
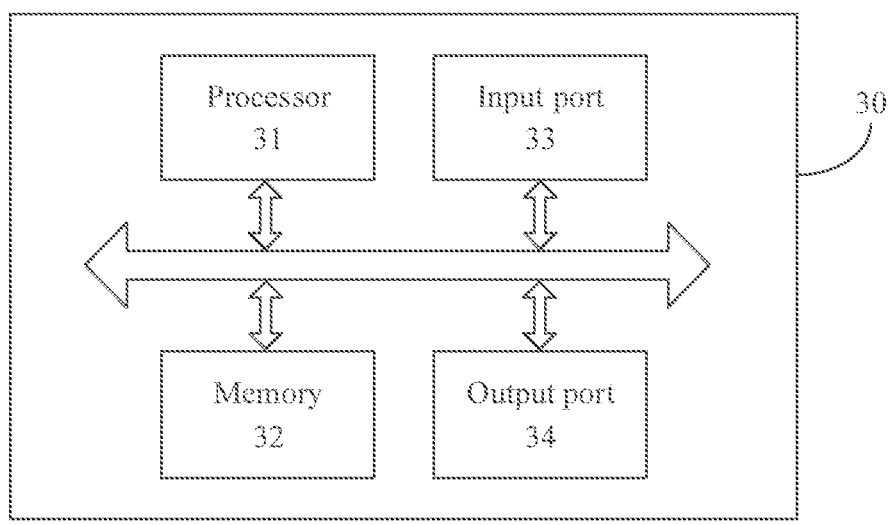
FIG. 7 is a schematic structural diagram of an example of a packet forwarding apparatus according to this application.

According to the foregoing method, FIG. 7 is a schematic diagram of a packet sending apparatus (or device) 30 according to an embodiment of this application. As shown in FIG. 7, the apparatus 30 may be a forwarding device (for example, the foregoing forwarding device #α), or may be a chip or a circuit, for example, a chip or a circuit that may be disposed in a forwarding device.

The apparatus 30 may include a processor 31 (an example of a processing unit) and a memory 32. The memory 32 is configured to store an instruction, and the processor 31 is configured to execute the instruction stored in the memory 32, to enable the apparatus 30 to implement the steps performed by the forwarding device (for example, the foregoing forwarding device #α) in the foregoing method (for example, the method 400).

Further, the apparatus 30 may further include an input port 33 (an example of a communications unit) and an output port 34 (another example of the communications unit). Further, the processor 31, the memory 32, the input port 33, and the output port 34 may communicate with each other through an internal connection path, to transmit a control signal and/or a data signal.

The memory 32 is configured to store a computer program. The processor 31 may be configured to invoke the computer program from the memory 32 and run the computer program, to control the input port 33 to receive a signal and the output port 34 to send a signal, thereby completing the steps performed by the forwarding device in the foregoing methods.

The memory 32 may be integrated into the processor 31, or may be separated from the processor 31.

Optionally, if the apparatus 30 is a forwarding device, the input port 33 is a receiver and the output port 34 is a transmitter. The receiver and the transmitter may be a same physical entity or different physical entities. When being a same physical entity, the receiver and the transmitter may be collectively referred to as a transceiver.

Optionally, if the apparatus 30 is a chip or a circuit, the input port 33 is an input interface and the output port 34 is an output interface.

In an implementation, it may be considered that functions of the input port 33 and the output port 34 are implemented by using a transceiver circuit or a dedicated transceiver chip. It may be considered that the processor 31 is implemented by using a dedicated processing chip, a processing circuit, a processor, or a general-purpose chip.

In another implementation, it may be considered that the control device provided in this embodiment of this application is implemented by using a general-purpose computer. To be specific, program code that is used to implement functions of the processor 31, the input port 33, and the output port 34 is stored in the memory 32, and a general-purpose processor implements the functions of the processor 31, the input port 33, and the output port 34 by executing the code in the memory 32.

In this embodiment of this application, the processor 31 is configured to record mapping relationship information. The mapping relationship information is used to indicate a session corresponding to at least one device identifier, and the session is a session between a terminal device indicated by the corresponding device identifier and the forwarding device.

The input port 33 is configured to receive a first packet sent by a first terminal device by using a first session, and obtain a second device identifier carried in a destination address field of the first packet.

The processor 31 is configured to, if the second device identifier is recorded in the mapping relationship information, determine, based on the mapping relationship information, a second session corresponding to the second device identifier.

The output port 34 is configured to send, by using the second session, the first packet to a second terminal device indicated by the second device identifier.

Optionally, a session recorded in the mapping relationship information further includes a first identifier, and a first identifier of each session is used to indicate whether the session is used to bear an group communication service, and the processor 31 is configured to determine, based on a first identifier of the first session, that the first session is used to bear an group communication service.

Optionally, a packet received by the forwarding device further includes a second identifier, and a second identifier of each packet is used to indicate whether the packet is used to belong to an group communication service, and the processor 31 is configured to determine, based on a second identifier of the first packet, that the first packet belongs to an group communication service.

Optionally, the apparatus 30 is disposed on a UPF entity or is a UPF entity.

The foregoing listed functions and actions of the modules or units in the apparatus 30 are merely examples for description. The modules or units in the apparatus 30 may be configured to perform actions or processing processes performed by the forwarding device in the method 400. To avoid repetition, detailed descriptions are omitted herein.

For example, the processor 31 may perform the actions performed by the UPF #α in the foregoing S420 and S430.

For concepts, explanations, detailed descriptions, and other steps of the apparatus 30 that are related to the technical solutions provided in the embodiments of this application, refer to the descriptions of the content in the foregoing methods or other embodiments. Details are not described herein again.

In a possible implementation, with development of a SoC technology, all or some functions of the apparatus 30 are implemented by using the SoC technology, for example, implemented by using a forwarding device function chip. The forwarding device function chip integrates components such as a processor, a memory, and a communications interface. A program of a forwarding device-related function is stored in the memory. The processor executes the program to implement related functions of a base station. Optionally, the forwarding device function chip can also read a memory outside the chip to implement the related functions of the base station.

It should be understood that the structure of the apparatus 30 shown in FIG. 7 is merely a possible form, but should not constitute any limitation to this embodiment of this application. In this application, there may be a base station structure in another form in the future.

According to the methods provided in the embodiments of this application, an embodiment of this application further provides a communications system, including the foregoing control device and one or more forwarding devices.

It should be understood that, the processor in the embodiments of this application may be a CPU, or may be another general-purpose processor, a digital signal processor (DSP), an application specific integrated circuit (ASIC), a field programmable gate array (F PGA), or another programmable logic device, a discrete gate or transistor logical device, a discrete hardware component, or the like. The general-purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an EPROM, an electrically erasable programmable read-only memory (EEPROM), or a flash memory. The volatile memory may be a random-access memory (RAM), used as an external cache. Through example but not limitative description, many forms of RAM are available, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DR RAM).

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A session establishment method, implemented by a control device, wherein the session establishment method comprises:
receiving a message comprising first request information indicating that a first terminal device requests to access a group communication service;
determining a terminal device group to which the first terminal device belongs, wherein the control device determines the terminal device group based on a device identifier of the first terminal device or a group identifier of the terminal device group when the message carries the device identifier or the group identifier, respectively;
obtaining mapping relationship information indicating a first forwarding device corresponding to at least one terminal device group, wherein the at least one terminal device group comprises the terminal device group, and wherein the first forwarding device is configured to provide the group communication service for the at least one terminal device group;
determining, based on the mapping relationship information, the first forwarding device to serve the terminal device group; and
controlling the first terminal device to establish a session with the first forwarding device.

2. The session establishment method of claim 1, wherein the message comprises a protocol data unit (PDU) session establishment request.

3. The session establishment method of claim 1, further comprising:
sending, to a network repository entity, a query request requesting the network repository entity to query for the first forwarding device configured to support the group communication service; and
receiving, from the network repository entity, response information comprising at least one alternative forwarding device configured to support the group communication service, wherein determining the first forwarding device comprises determining the first forwarding device from the at least one alternative forwarding device.

4. The session establishment method of claim 3, wherein the query request comprises the group identifier of the terminal device group or the query request comprises a group communication service identifier.

5. The session establishment method of claim 1, further comprising recording, in the mapping relationship information, a mapping relationship between the terminal device group and the first forwarding device, wherein the mapping relationship information indicates the first forwarding device corresponds to the at least one terminal device group, and wherein the at least one terminal device group comprises the terminal device group.

6. The session establishment method of claim 1, wherein the control device comprises a session management entity.

7. The session establishment method of claim 6, wherein receiving the message comprising the first request information comprises receiving, from the first terminal device, a first message comprising the first request information, wherein when the first message carries the device identifier of the first terminal device, determining the terminal device group comprises:
sending second request information and the device identifier to a group management entity, wherein the second request information requests the group management entity to determine the terminal device group; and
determining the terminal device group based on the group identifier of the terminal device group from the group management entity, and wherein when the first message carries the group identifier, determining the terminal device group comprises determining the terminal device group based on the group identifier.

8. The session establishment method of claim 1, wherein the control device comprises a group management entity, and wherein the group identifier comprises a data network name created by the group management entity.

9. The session establishment method of claim 1, wherein receiving the message comprising the first request information comprises receiving, from a session management entity, a second message comprising the first request information, wherein when the second message carries the device identifier of the first terminal device, determining the terminal device group comprises determining the terminal device group based on the device identifier, and wherein when the second message carries the group identifier of the terminal device group, determining the terminal device group comprises determining the terminal device group based on the group identifier.

10. The session establishment method of claim 1, wherein the first forwarding device comprises a user plane entity.

11. A communications apparatus, comprising:
a memory configured to store instructions; and
a processor coupled to the memory and configured to executre the insructions to cause the communications apparatus to:
receive a message comprising first request information indicating that a first terminal device requests to access a group communication service;
determine a terminal device group to which the first terminal device belongs, wherein the terminal device group is determined based on a device identifier of the first terminal device or a group identifier of the terminal device group when the message carries the device identifier or the group identifier, respectively;
obtain mapping relationship information indicating a first forwarding device corresponding to at least one terminal device group, wherein the at least one terminal device group comprises the terminal device group, and wherein the first forwarding device is configured to provide the group communication service for the at least one terminal device group;
determine, based on the mapping relationship information, the first forwarding device to serve the terminal device group; and
control the first terminal device to establish a session with the first forwarding device.

12. The communications apparatus of claim 11, wherein the message comprises a protocol data unit (PDU) session establishment request.

13. The communications apparatus of claim 11, wherein the processor is further configured to execute the instructions to cause the communications apparatus to:
send, to a network repository entity, a query request requesting the network repository entity to query for the first forwarding device capable of supporting the group communication service;
receive, from the network repository entity, response information comprising at least one alternative forwarding device configured to support the group communication service; and further determine the first forwarding device from the at least one alternative forwarding device.

14. The communications apparatus of claim 13, wherein the query request comprises the group identifier of the terminal device group or the query request comprises a group communication service identifier.

15. The communications apparatus of claim 11, wherein the processor is further configured to execute the instructions to cause the communications apparatus to record, in the mapping relationship information, a mapping relationship between the terminal device group and the first forwarding device, wherein the mapping relationship information indicates the first forwarding device corresponds to the at least one terminal device group, and wherein the at least one terminal device group comprises the terminal device group.

16. The communications apparatus of claim 11, wherein the communications apparatus is disposed on a session management entity or the communications apparatus is the session management entity.

17. The communications apparatus of claim 16, wherein the processor is further configured to execute the instructions to cause the communications apparatus to receive, from the first terminal device, a first message comprising the first request information, wherein when the first message carries the device identifier of the first terminal device, the instructions further cause the communications apparatus to be configured to:
  send second request information and the device identifier to a group management entity, wherein the second request information requests the group management entity to determine the terminal device group; and
  determine the terminal device group based on the group identifier of the terminal device group from the group management entity, and wherein when the first message carries the group identifier, the instructions further cause the communications apparatus to be configured to determine the terminal device group based on the group identifier.

18. The communications apparatus of claim 11, wherein the communications apparatus is disposed on a group management entity or the communications apparatus is the group management entity.

19. The communications apparatus of claim 11, wherein the processor is further configured to execute the instructions to cause the communications apparatus to receive, from a session management entity, a second message comprising the first request information,
  wherein when the second message carries the device identifier of the first terminal device, the instructions further cause the communications apparatus to be configured to determine the terminal device group based on the device identifier, and
  wherein when the second message carries the group identifier of the terminal device group, the instructions further cause the communications apparatus to be configured to determine the terminal device group based on the group identifier.

20. The communications apparatus of claim 11, wherein the first forwarding device comprises a user plane entity.

* * * * *